US009723300B2

(12) United States Patent
Riedel

(10) Patent No.: US 9,723,300 B2
(45) Date of Patent: Aug. 1, 2017

(54) STEREOSCOPIC DISPLAY

(71) Applicant: Nicholas V. Riedel, Queen Creek, AZ (US)

(72) Inventor: Nicholas V. Riedel, Queen Creek, AZ (US)

(73) Assignee: Spatial Intelligence LLC, Georgetown, TX (US)

( * ) Notice: Subject to any disclaimer, the term of this patent is extended or adjusted under 35 U.S.C. 154(b) by 314 days.

(21) Appl. No.: 14/660,937

(22) Filed: Mar. 17, 2015

(65) Prior Publication Data

US 2015/0264339 A1 Sep. 17, 2015

Related U.S. Application Data

(60) Provisional application No. 61/954,543, filed on Mar. 17, 2014.

(51) Int. Cl.
*H04N 13/04* (2006.01)
*G02B 27/26* (2006.01)
(Continued)

(52) U.S. Cl.
CPC ..... *H04N 13/0484* (2013.01); *G02B 27/0093* (2013.01); *G02B 27/2235* (2013.01);
(Continued)

(58) Field of Classification Search
CPC G02B 27/2235; G02B 27/26; G02B 27/0093; G02B 27/283; G06F 3/011; G06F 3/013; H04N 13/0443; H04N 13/0484
See application file for complete search history.

(56) References Cited

U.S. PATENT DOCUMENTS 7,812,815 B2 10/2010 Banerjee et al.
2011/0046483 A1 2/2011 Fuchs et al.
(Continued)

OTHER PUBLICATIONS

Anand M., Design and Development of Mobile Image Overlay System for Image-Guided Interventions (Master's thesis). Retrieved from https://qspace.library.queensu.ca/bitstream/1974/12255/3/Anand_Manjunath_201406_MASc.pdf. Jun. 2014.
(Continued)

*Primary Examiner* — Sath V Perungavoor
*Assistant Examiner* — Peet Dhillon
(74) *Attorney, Agent, or Firm* — Jeffrey Parry Intellectual Property Law Group PLLC; Jeffrey C. Parry

(57) ABSTRACT

A direct interaction stereoscopic display system that produces an augmented or virtual reality environment. The system comprises one or more displays and one or more beam combiners to virtually project high-resolution flicker-free stereoscopic 3D imagery into a graphics volume in an open region. Viewpoint tracking is provided enabling motion parallax cues. A user interaction volume co-inhabits the graphics volume and a precise low-latency sensor allows users to directly interact with 3D virtual objects or interfaces without occluding the graphics. An adjustable support frame permits the 3D imagery to be readily positioned in situ with real environments for augmented reality applications. Individual display components may be adjusted to precisely align the 3D imagery with components of real environments for high-precision applications and also to match accommodation-vergence distances to prevent eye strain. The system's modular design and adjustability allows display panel pairs of various sizes and models to be installed.

19 Claims, 19 Drawing Sheets

(51) Int. Cl.
*G06F 3/01* (2006.01)
*G02B 27/22* (2006.01)
*G02B 27/00* (2006.01)
*G02B 27/28* (2006.01)

(52) U.S. Cl.
CPC .............. *G02B 27/26* (2013.01); *G06F 3/011* (2013.01); *G06F 3/013* (2013.01); *H04N 13/0443* (2013.01); *G02B 27/283* (2013.01)

(56) References Cited

U.S. PATENT DOCUMENTS

| | | | |
|---|---|---|---|
| 2012/0005624 A1 | 1/2012 | Vesely | |
| 2012/0113140 A1* | 5/2012 | Hilliges | G06F 3/011 345/633 |
| 2012/0117514 A1 | 5/2012 | Kim et al. | |
| 2014/0125694 A1* | 5/2014 | Kaplan | G02B 27/01 345/629 |

OTHER PUBLICATIONS

Hachet, M., et al., Toucheo: Multitouch and Stereo, UIST 2011—ACM Symposium on User Interface Software and Technology, 2011, 587-592.

Lee, J.; Olwal, A.; Ishii, H., Boulanger, C., SpaceTop: Integrating 2D and Spatial 3D Interactions in a See-through Desktop Environment, CHI 2013, Apr. 27-May 2, 2013, Paris. URL: http://www.olwal.com/projects/research/spacetop/lee_spacetop_chi_2013.pdf, last accessed Sep. 12, 2015.

Liao, H.; Nakajima, S.; Iwahara, M.; Hata, N.; Sakuma, I.; Dohi, T., Real-time 3D image-guided navigation system based on integral videography, Proceedings of SPIE, 2002, 36-44, vol. 4615, San Jose, USA.

PS-Medtech, C-Station, Falckstaadt 53, 1017VV Amsterdam, The Netherlands, hshttp://ps-medtech.com/files/2015/05/20141203-White-paper-C-station-final.pdf, last accessed Oct. 19, 2015.

Schnaider, M.; Schwald, B. et al., Medarpa—a Medical Augmented Reality System for Minimal-Invasive Interventions, Stud Health Technol Inform, 2003, 312-4, v.94.

* cited by examiner

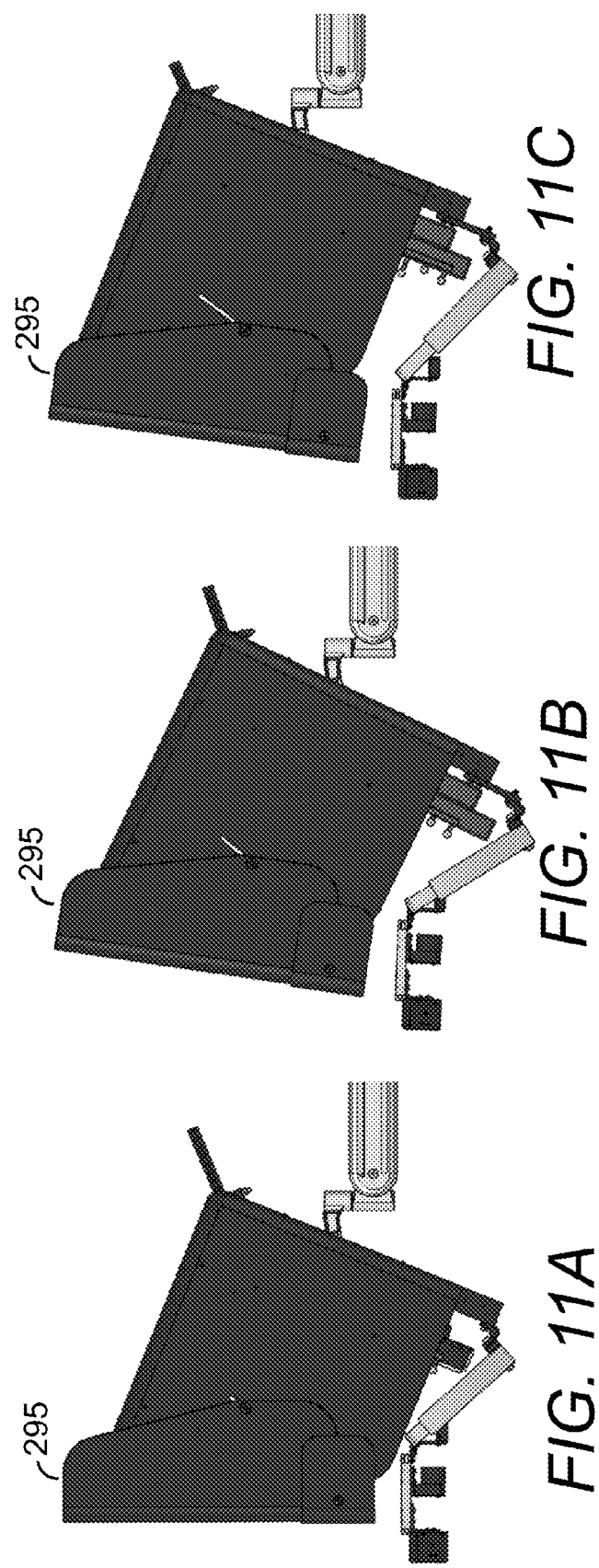

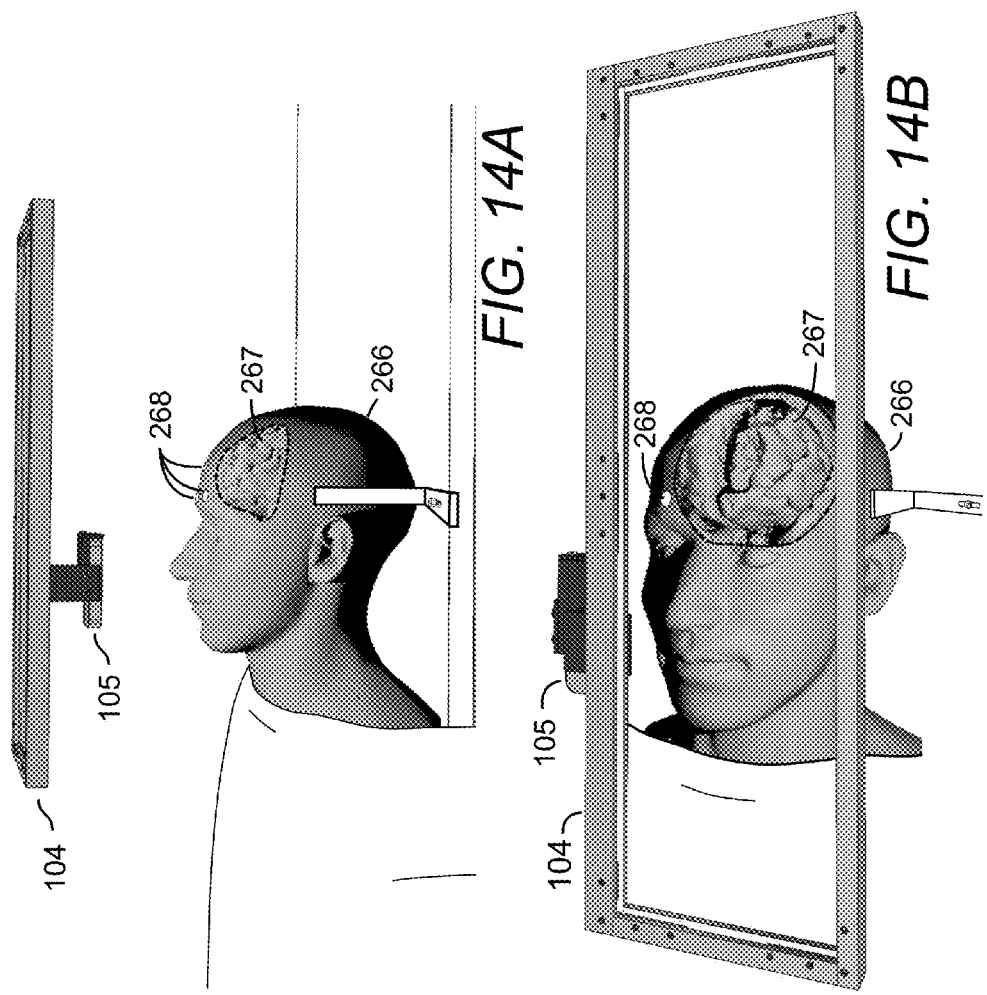

STEREOSCOPIC DISPLAY

CROSS-REFERENCE TO RELATED APPLICATIONS

This application claims priority under 35 USC §119 to U.S. Provisional Patent Application Ser. No. 61/954,543, filed Mar. 17, 2014, and titled "COMPACT DYNAMICALLY ADJUSTABLE IMMERSIVE STEREOSCOPIC DISPLAY AND DIRECT INTERACTION SYSTEM," the entire contents of which are hereby incorporated by reference.

BACKGROUND

Technical Field

The present disclosure relates generally to interactive three-dimensional ("3D") displays. More particularly, the present disclosure addresses apparatus, systems, and methods making up a display system with 3D in situ visualization that can maintain the eye's natural accommodation-vergence relationship.

Description of Related Art

Interactive 3D display systems have been the subject of a number of developmental efforts over the past 30 years. The prospect of reaching out and directly interacting with virtual content is universally intriguing and may allow for step changes in creativity and efficiency in developing models, creating art, and understanding and manipulating complex data. Several groups have pursued merging 3D interactive displays in-situ with real environments. One aim of these groups has been to enable real-time guidance for critical tasks where there is limited visibility. Another aim has been to allow for accurate and intuitive in-field visualization of complex data.

Medicine is one of the fields that stand to benefit the most from directly interactive 3D display systems with in situ visualization. Surgeons are required to carry out operations in the least amount of time and with minimal invasiveness. Understanding the layout of the patient's internal anatomy may allow surgeons to plan the shortest and most direct path for completing operations. While CT, MRI, and ultrasound scans accurately lay out a patient's anatomical information, during surgery these modalities are usually displayed on monitors out of the field of view of the patient's body. The result is that surgeons have to mentally store scanned patient data from one view and transform and apply it to the view with the patient. A few methods have been developed to provide co-location of scanned data with the patient.

Head-mounted stereoscopic displays ("HMD") were proposed in some efforts as a solution, but these are heavy and awkward to use because the cables running to the HMD can restrict the freedom of movement of the user. HMDs are limited to displaying content at a single fixed or finite set of focal lengths. The focal length for single focal length HMDs is usually set at infinity while patient images from the display's stereo screen converge at the actual distance of the patient (usually arm's length or less). This disparity may result in accommodation-vergence conflict where the eyes converge on a plane at a certain distance but are accommodated at a plane at another distance. Breaking of the natural accommodation-vergence relationship can lead to eye fatigue and result in difficulty achieving optical fusion where left and right images no longer appear fused. One HMD has been designed with three focal lengths. In this system, software toggles between the three fixed focal lengths and infers the closest appropriate length based on the position of the user in relation to the virtual content. This solution could bring the disparity in accommodation-vergence closer in line. However, as the nature of surgery requires surgeons to arbitrarily move closer to patients for more detail and further away to establish the overall layout, there would be frequent significant disparities in the regions between the focal lengths.

Head-mounted displays are also especially prone to temporal misalignment in the imagery as a result of latency. This latency is significant during fast head movements, and in augmented reality applications the magnitude of the latency is intensified in proportion to the distance between the viewer and the subject. In medical settings, the distance between the surgeon and patient can be enough to introduce significant latency issues. Another issue with using head-mounted displays in surgical settings is that assistants are not able to observe with the surgeon the augmented graphics presented in context with the patient unless they themselves are wearing head-mounted displays, which adds additional cost and complexity to the system. Assistants are usually left to follow along on standard overhead displays, with the original disadvantage of not being able to fuse the patient data with actual anatomy.

Various additional display systems implemented to provide interactive 3D display systems with in situ visualization may use combinations of technique and/or equipment such as projection of images using semi-transparent mirrors, sensors to track the viewer's head to overlay a virtual view co-located with a subject, and stereoscopic viewing devices. Such display systems exhibit several shortcomings. For example, such display systems may result in the viewer repeatedly shifting focus between the projected image plane and the subject, which is unintuitive and could lead to, for example, blurred vision and/or inaccurate movements during surgery. Other shortcomings of such display systems may include large system footprints, reduced access to patients, weak and expensive equipment, latency in viewer movement tracking, and inducement of eye strain, fatigue, and dizziness in the viewer.

SUMMARY

In one embodiment, a display system is disclosed. The display system includes a user interaction volume, a first display for displaying a first image, a second display for displaying a second image, a first beam combiner, a second beam combiner, one or more tracking sensors, and a processor.

The first beam combiner is positioned at least partway between the first display and the second display and is configured to receive, and to optically overlay, the first and second images. Each of the first display and the second display is concurrently devoted to either the left or the right stereo image channel. The first beam combiner has a substrate surface at least partially facing one display, wherein light from that display is transmitted towards the user interaction volume. The first beam combiner also has a mirrored surface at least partially facing the second display, whereat light from the second display is reflected towards the user interaction volume.

The second beam combiner is offset from first beam combiner in the direction of the user interaction volume. The second beam combiner is configured to receive and to optically overlay the combined first and second images relayed from the first beam combiner with a view of the user interaction volume. The combined two images form respective stereoscopic left eye and right eye images of a virtual environment, whereby a user looking at the second beam combiner from a user view position perceives the virtual environment reflected from the second beam combiner as originating from within the user interaction volume.

The second beam combiner has a substrate surface at least partially facing the user interaction volume, wherein light from the user interaction volume is transmitted towards the user view position. The second beam combiner also has a mirrored surface at least partially facing the first beam combiner, wherein light from the first beam combiner is reflected towards the user view position The tracking sensors are arranged to sense at least a first input within the user interaction volume and at least a second input within a second volume region The first input includes position and orientation information of at least one user-controlled object. The second input includes user viewpoint position and orientation information. The processor is arranged to receive the second input and adapt positioning of the images of the virtual environment so that the virtual environment appears visually aligned with the user interaction volume according to a perspective of the user. The processor is also arranged to receive the position and orientation information of the at least one user-controlled object and determine a corresponding position and orientation in the virtual environment. The processor is also arranged to update the virtual environment based on the corresponding position and orientation.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the disclosure to those skilled in the art.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIGS. 11A, 11B, and 11C are side schematic views of an embodiment of an immersive, direct interaction stereoscopic display system including an adjustable cover used to prevent glare and block views to the lower display panel;

FIGS. 14A and 14B are front perspective and user perspective schematic views, respectively, of an embodiment of an immersive, direct interaction stereoscopic display system illustrating the ability of the system to virtually project 3D patient internal anatomy data in situ with patient's bodies to assist in training, intraoperative visualization, surgery rehearsals, and surgery planning;

Figure 1:
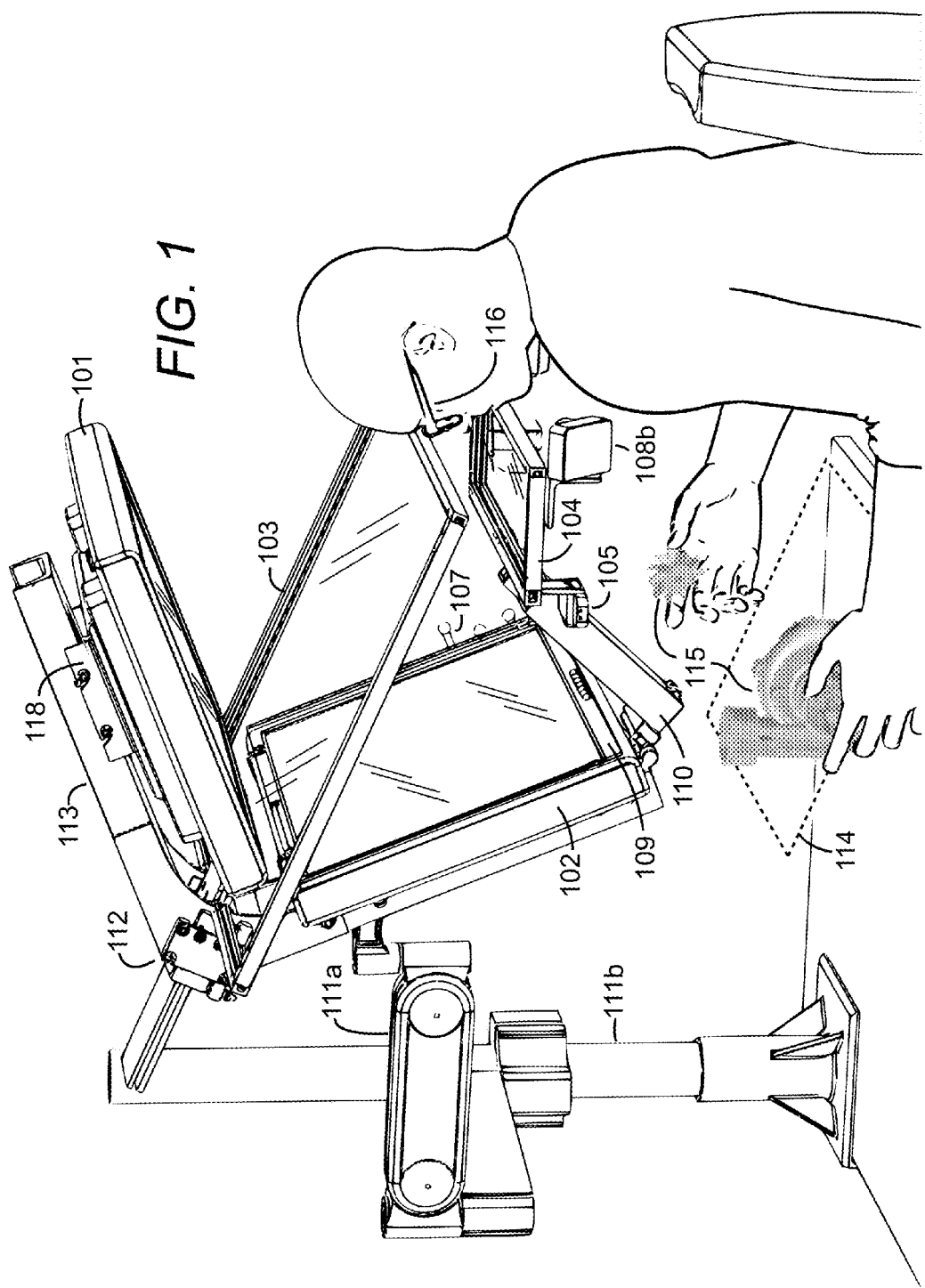
FIG. 1 is a perspective schematic view of an embodiment of an immersive, direct interaction stereoscopic display system according to various embodiments of the present disclosure showing the locations of a virtual display plane and virtual 3D work pieces.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, reference is made to exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples.

Systems described herein may be useful for a variety of applications. Scientific visualization, medical training and surgical intraoperative visualization are some of the areas that stand to benefit from embodiments of the present disclosure. The present system uses novel means to serve the needs of these industrial fields as well as consumer-level applications and achieve high standards in the areas where previous systems have fallen short.

An embodiment of a compact, adjustable, direct interaction stereoscopic display system is illustrated in FIG. 1. This figure illustrates one method of interaction by a user with an embodiment of the system. A processor or processors, not pictured, manages all tasks associated with graphics generation, tracking, interaction simulation, and all other relevant input and output operations. The user is presented with a stereoscopic three-dimensional model 115 or interface that appears to originate from beneath the system in a user interaction volume in front of the user. The term "user interaction volume" refers to a region in which a user may use their hands or other user-controlled objects to interact with virtual objects or interfaces that appear co-located in the same space. The display system virtually projects 3D imagery into the interaction volume where the user utilizes stereoscopic cues and/or accommodation cues to spatially locate the components of the 3D imagery. This further triggers the proprioceptive sense of the user, which is the sense of the position of one's joints and limbs. The system complies with the subsequent intuitive impulse of the user to reach out to directly "touch" or interact with the graphics. The system detects the locations of the fingers or hands of the user or objects under the control of the user and creates a co-located virtual representation of the hands or objects. The system simulates reactions between the virtual representation of the hands or objects and the 3D virtual objects or interfaces, which results in the user feeling as though he or she is directly interacting with the virtual environment. In other words, in the embodiment depicted, hardware and software components of the system function together to allow the user to interact with virtual models 115 or interfaces directly using one or more of the hands of the user or one or more user-controlled objects. To the user, it would seem as if the he or she were interacting with real physical objects or interfaces. "Direct interaction" is the phrase used herein to refer to the concept of a user directly interacting with or manipulating virtual objects or interfaces in a volume of space where the virtually projected 3D virtual objects or interfaces and the physical interaction region are co-located. As the user moves about the display system, the virtual model 115 or scene is updated to appear in the correct perspective to further reinforce the illusion that the object or scene is actually present.

The two display panels 101 and 102 present left and right channels of stereoscopic images, which are relayed through a first and second beam combiner 103 and 104, respectively. The combined image planes of the displays 101 and 102 fold into a single virtual image plane 114. At least one of the tracking sensors 108b or 108a, one of which 108a is obscured in this figure, tracks the user viewpoint position based on markers attached to stereoscopic glasses 116, worn by the user. Here, the term "user viewpoint position" refers to the position and orientation of one or both of the eyes of the user. The system calculates the user viewpoint position in relation to the display system. In one embodiment, an additional sensor 106, not shown in this view, tracks the position and orientation of the display 102 in relation to the second beam combiner 104, by tracking the marker 107 attached to the display 102. This information is then used to determine the position and orientation of the virtual screen plane 114 relative to the system.

Using the information provided by one or both of the user viewpoint tracking sensors 108a and 108b and the display component position tracking sensor 106, the system calculates where to display the images of virtual objects 115 or interfaces so that they appear in the proper perspective as the user moves about. This would allow a user to move about and see different sides of a virtual object to more intuitively understand its structure, for instance. In an embodiment, an additional low-latency tracking sensor 105, especially suited for hand or similar-scale object tracking, captures the position and orientation of the hands and fingers of the user or other objects under control of the user. As alluded to before, the system calculates the proximity of the hands or user-controlled objects to the virtual objects 115 or interfaces and, based on rules generated by software, manipulates the virtual objects or interfaces accordingly.

Continuing on to the means of supporting and adjusting the position of the display system, an embodiment of the system features an adjustable support arm 111a with a range of adjustments including height, forward and backward position, left and right position, horizontal swivel and vertical tilt to suit the ergonomic or functional needs of the user. In one embodiment, the support arm 111a attaches to a firmly mounted vertical pole 111b. The mount that attaches to the pole 111b may be easily loosened and re-tightened to a range of heights to allow, for instance, for primarily sit-down or stand-up use of the system. In another embodiment of the system, the support arm features a high range of motion allowing for sit-down or stand-up use so that the pole mount may remain fixed in one position without the need to readjust. The adjustable support arm 111a and compact design of the system advantageously allows the system to be positioned in close proximity to real world environments for various mixed reality applications. Some of these applications are discussed in more detail in later sections.

A pair of display panels 101 and 102 are attached to the frame with quick-install type mounts 118 in a embodiment of the present disclosure. The quick-install mounts 118 use standard VESA hole patterns to allow a variety of display panel pairs to be used with the system. The framework 113 that supports the displays 101 and 102 has multiple mounting holes or slots where the quick-install mounts 118 attach to allow the installation of display pairs of a variety of sizes. The displays panels 101 and 102 used in the system should ideally be matching models with similar screen size and polarization. In the embodiment shown, the system will accommodate a variety of display pair screen sizes, for instance, from less than 23" up to slightly over 27" LCDs. In the embodiment shown, the framework 113 supports the display screens 101 and 102 at a 90-degree angle. Some embodiments of the system are envisioned to be equivalently serviceable with a frame that supports the displays at an angle greater than or less than 90 degrees.

A first beam combiner 103 is attached to an adjustment apparatus 112 that mounts to the display system support frame 113 in one embodiment. The adjustment apparatus 112 includes adjustments for tilt and elevation for the left and right side so that the first beam combiner 103 may be positioned substantially perfectly or perfectly at the bisecting angle between the display panels 101 and 102. The adjustable mount 112 also includes a means to adjust the thrust distance of the first beam combiner 103 along the bisecting angle between the first and second display panels 101 and 102. This thrust distance adjustment is incorporated to allow the use of display panels of various sizes. The thrust adjustment also creates room for the user to have a full view of the virtual screen plane 114 when adjustments are made to the position and orientation of the virtual screen plane 114.

Also shown in FIG. 1 is an optical filter 109 that incorporates a half-wave plate and a linear polarizing film. The optical filter 109 is used to rotate the natural polarization angle of the display 102 by 90 degrees. This is necessary for when the system uses in-plane switching (IPS) display panels or displays panels which have a natural polarization angle that is perpendicular or parallel to the sides of the display. This topic is covered in further detail in a subsequent section.

Figure 2:
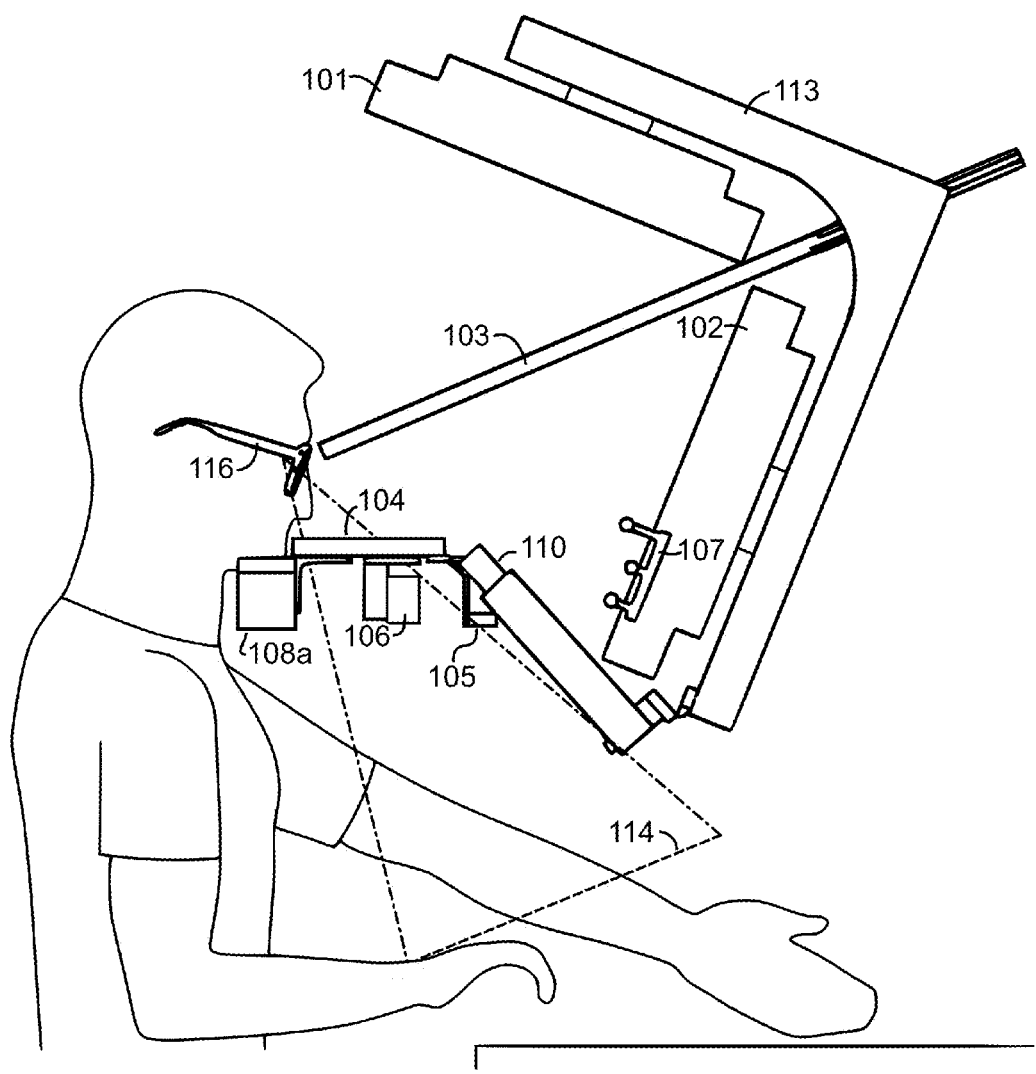
FIG. 2 is a side schematic view of an embodiment of an immersive, direct interaction stereoscopic display system showing the location of a virtual display plane.

Reference is now made to FIG. 2, which shows a side schematic view of an embodiment of the system. In this view, the virtual screen plane 114 is illustrated and sight lines from the user to the top and the bottom edges are shown. The virtual screen plane 114 can be adjusted closer to or further from the user and set at various angles by adjusting the support arm 110 of the second beam combiner 104. In various embodiments, the support arm 110 is adjustable to allow the second beam combiner 104 to be set to a variety of positions and orientations set by the user. In some embodiments, the second beam combiner 104 may be set into position by simply grasping and moving it, without needing to loosen or tighten adjusting screws or use any tools. The ability to arbitrarily reposition the virtual screen plane 114 also allows the accommodation distance of the graphics to be set to match the convergence distance of the eyes. In other words, this means that the graphics will appear in focus at the same plane at which the eyes are converging. This is the most comfortable way to view stereoscopic images. While people have some tolerance for accommodation-convergence mismatch, if the mismatch is too large, the image goes out of focus or stereo fusion is lost. This adjustment ability also permits the virtual image plane 114 to be positioned in close proximity to or directly overlaying components in real environments for augmented reality applications.

FIG. 2 also illustrates the distance of the virtual screen plane in relation to the arm reach of a user. For direct interaction applications, the image plane 114, at the adjusted distance shown, is well within a comfortable reaching distance of the majority of potential users. Regarding the viewing angle, previous ergonomic studies have shown that, a significantly downward gaze angle is the best angle for close work. This can be verified, anecdotally, by considering how most people tend to read books and magazines at a low downward angle as opposed to at horizon level. Ergonomic studies have, in fact, recommended positioning displays at up to a 50° angle below horizon level for displays at a 25" distance and to an even greater downward angle for closer viewing distances. The virtual image plane 114 in the embodiment depicted in FIG. 2 shows the virtual image plane 114 at around a 19" distance from the eyes of the user and at a downward angle of 55° below the horizon. In this position, the virtual screen plane 114 is well within comfortable reach of the user and interaction with virtual objects or interfaces presented by the display is facilitated.

Figure 3A:
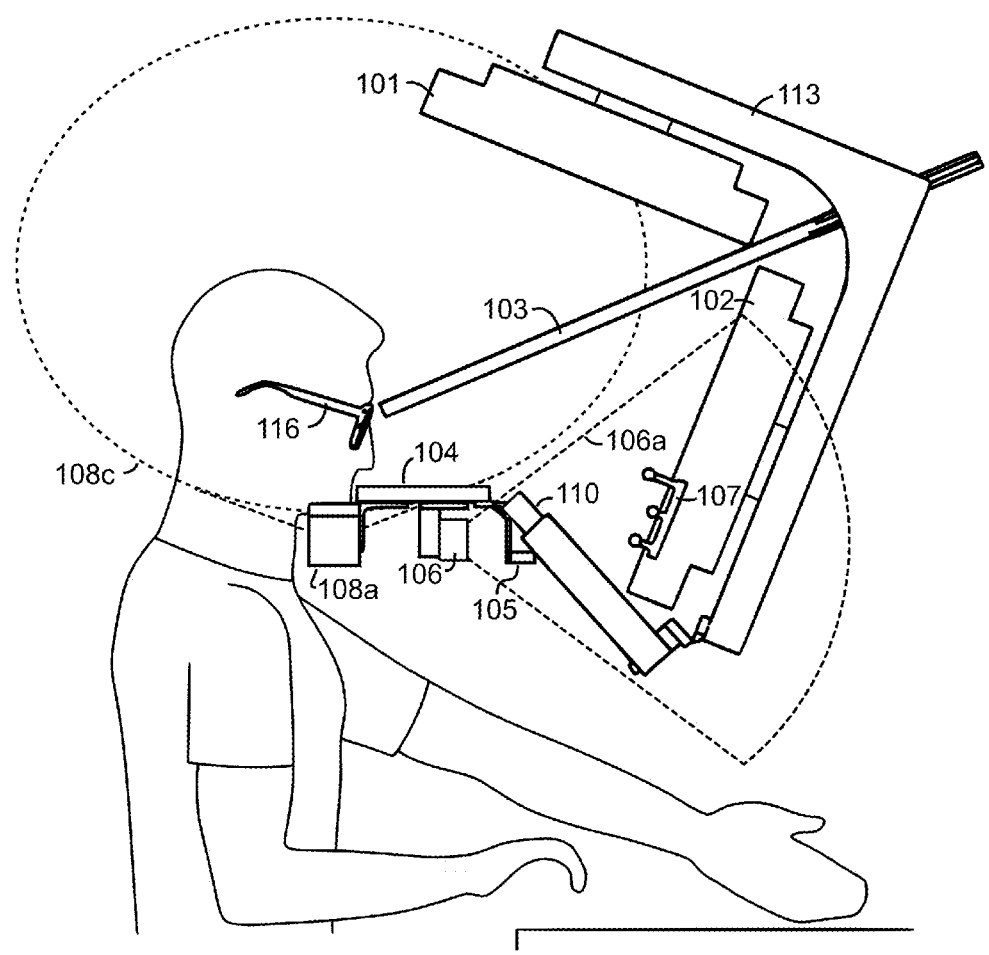
FIG. 3A is a side schematic view of an embodiment of an immersive, direct interaction stereoscopic display system showing fields of view of head tracking and display-tracking sensors.
Figure 3B:
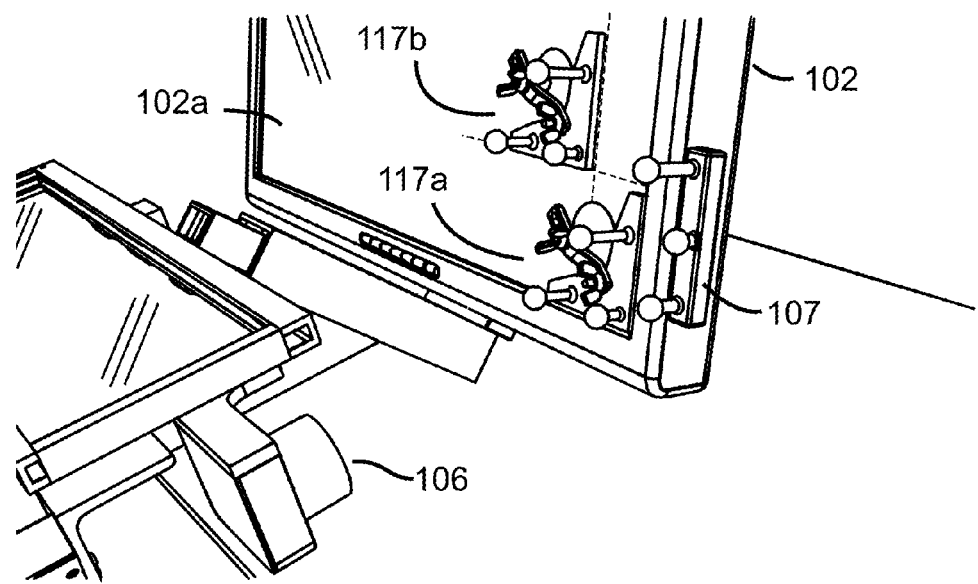
FIG. 3B is a perspective schematic detail view of two types of display tracking markers including one set that mounts temporarily on the screen surface for initial registration of the screen location and a separate marker mounted on the side of the display panel for subsequent tracking.
Figure 3C:
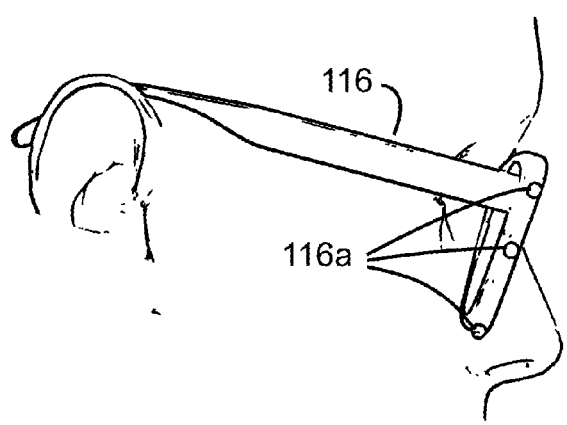
FIG. 3C is a side schematic detail view of 3D polarized glasses showing attached fiducial markers.

FIGS. 3A to 3C show a side schematic view of an embodiment of the system, a perspective detail view of display tracking markers 107, and a detailed side view of the stereoscopic polarized glasses 116 worn by the user for various embodiments of the system. FIG. 3A illustrates the field of view cone 108c of a user-viewpoint tracking sensor 108a and the field of view cone 106a of a display component tracking sensor 106. The position and orientation of the display 102 is tracked by the sensor 106 which captures images of the tracking marker 107, which is rigidly attached to the display panel 102. The sensor 106 relays images to a processor, not displayed, where software-generated algorithms are used to calculate the position and orientation of the screen 102a of the display panel 102. The calculation takes into account the previously-gathered information on the location of the screen 102a in relation to the position of the tracking marker 107. The location of the screen 102a is required to calculate the virtual screen plane 114 location. This location information is then used to facilitate the simulation of direct interaction with virtual objects 115 or interfaces. A registration routine is used upon system setup to establish information about the position and orientation of the screen 102a in relation to the tracking marker 107.

FIG. 3B illustrates the components used for initially registering the position and orientation of the screen 102a in relation to the display tracking marker 107 in some embodiments. When first setting up the system, or when a new display panel pair is installed on the system, the tracking marker 107 is attached on the lower side of the display panel 102 near the center of the field of view 106a of the display component tracking sensor 106. To register the precise location of the screen 102a of the display panel 102, removable tracking markers 117a and 117b are attached on the face of the screen 102a. In the embodiment shown in FIG. 3B, the tracking markers 117a and 117b feature a square corner. In this embodiment, one of the tracking markers 117a is temporarily mounted on the face of the screen 102a so that the square corner of the tracking marker 117a aligns with the lower right corner of the screen 102a where the pixels terminate. The other tracking marker 117b temporarily mounts at a given percentage horizontal and vertical distance away from the lower right screen corner, which may be indicated by a cross hair displayed by the system at the correct location. Upon initial setup of the system, or whenever a new display panel pair is installed with the system, the sensor 106 captures images of all three tracking markers 107, 117a and 117b, after all have been attached according to the guidelines previously outlined. The system registers the location of the display screen itself 102a in relation to the tracking marker 107. After the initial registration, the temporary tracking markers, 117a and 117b are removed and the location of the display screen 102a is thereafter determined using solely the tracking marker 107 mounted on the side of the display panel 102. In some embodiments, the initial registration of the position and orientation of the screen 102a may also be accomplished using a hand-held, tracked, pointed input device which may be pointed at previously specified points on the screen. In other embodiments, the position and orientation of the screen 102a may be calculated by using the marker 107 attached at a specific position on the panel in conjunction with stored geometric information about the display panel 102.

Returning to FIG. 3A, the user viewpoint position tracking sensor 108a may be one of two sensors mounted on the second beam combiner 104. This sensor or sensors is configured to capture images within a field of view 108c, as shown. In some embodiments, the positions and orientations of both eyes are considered. The system determines the locations of the eyes, first, by capturing images of the tracking markers 116a on the glasses 116 illustrated in FIG. 3C. Then, as the geometry of the glasses 116 is known and stored in memory, the system calculates the view center of the eyes. The system may then use stored information about average human inter-ocular distances or, alternatively, reference an actual inter-ocular distance input by the user from some previous measurement to calculate the specific position and orientation of each eye. A single user-viewpoint position tracking sensor 108a or 108b is capable of determining the eye locations of the user independently. However, in some embodiments, an additional sensor is used on the opposite side of the second beam combiner 104 to provide robust tracking for various extreme instances. These instances include when the user moves close enough to the sensor 108a that the tracking markers 116a move outside of the field of view cone 108c of the sensor 108a, when the user rotates their head enough that the line of sight from one sensor 108a to the markers 116a is obstructed, or when extraneous objects migrate in to the field of view and occlude the line of sight to the tracking markers 116a.

Figure 4:
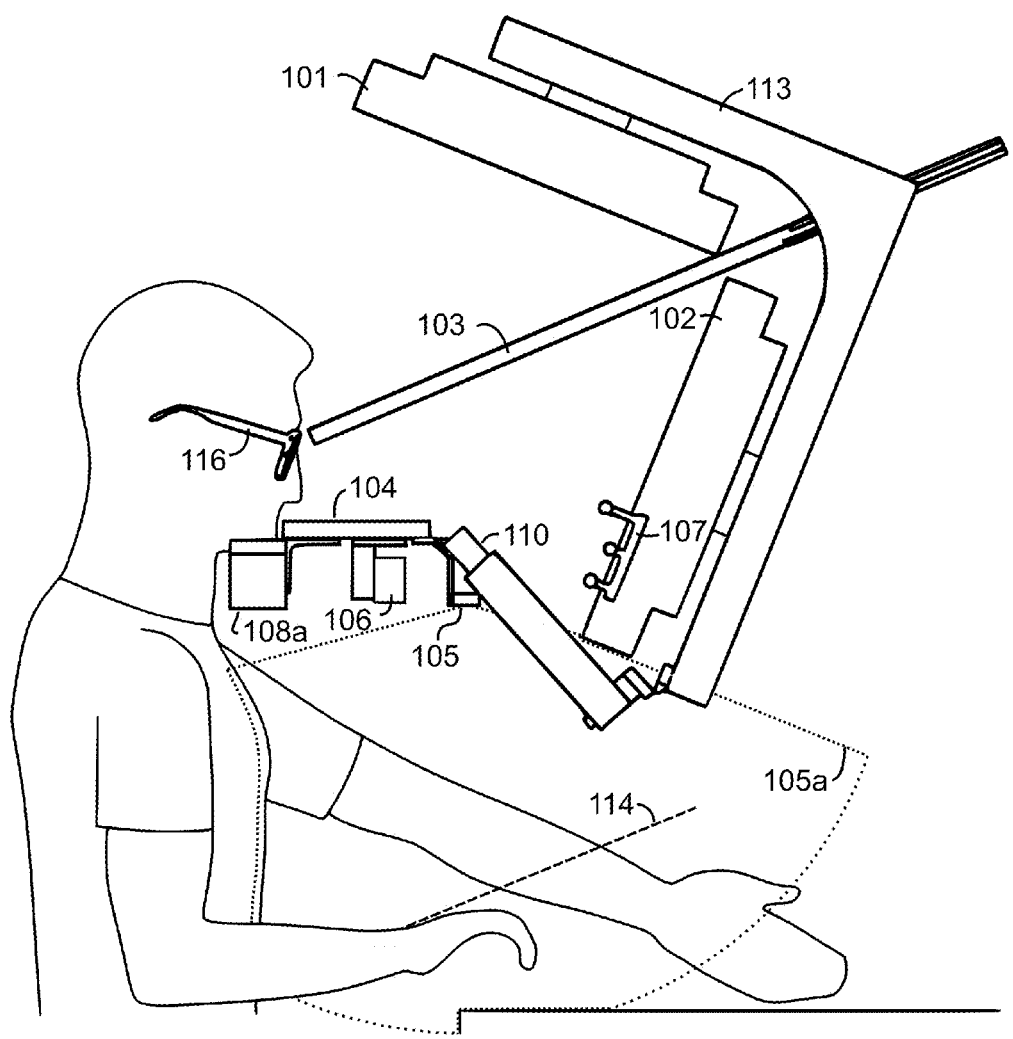
FIG. 4 is a side schematic view of an embodiment of an immersive, direct interaction stereoscopic display system showing the field of view of a sensor for tracking hands or user-controlled objects.

Turning to FIG. 4, this side schematic view of one embodiment illustrates the field of view 105a of the user interaction volume-tracking sensor 105. In the embodiment depicted, this sensor is a commercially available, low-latency sensor designed to track one or more objects within a volume similar to the cone-shaped volume 105a illustrated. The outline of the field of view 105a of the sensor 105 represents a portion of the range where the sensitivity of the sensor 105 is highest. The sensor 105 has an even greater range with ideal lighting conditions. The sensor 105 captures pose and position of the hand and fingertips as well as the tips and 3D vector directions to the tips of user-controlled objects such as pens, styli, pointers et cetera with accuracy in the sub-millimeter range. Software linked to the sensor 105 reconstructs virtual hands or virtual objects that closely matches the actual hand gestures or object movements with very low latency. The combination of low-latency, sub-millimeter accurate tracking combined with high resolution 3D imagery that co-locates with the user interaction volume provided by the system opens the door for applications that are extremely intuitive, immersive, precise and realistic.

Figure 5:
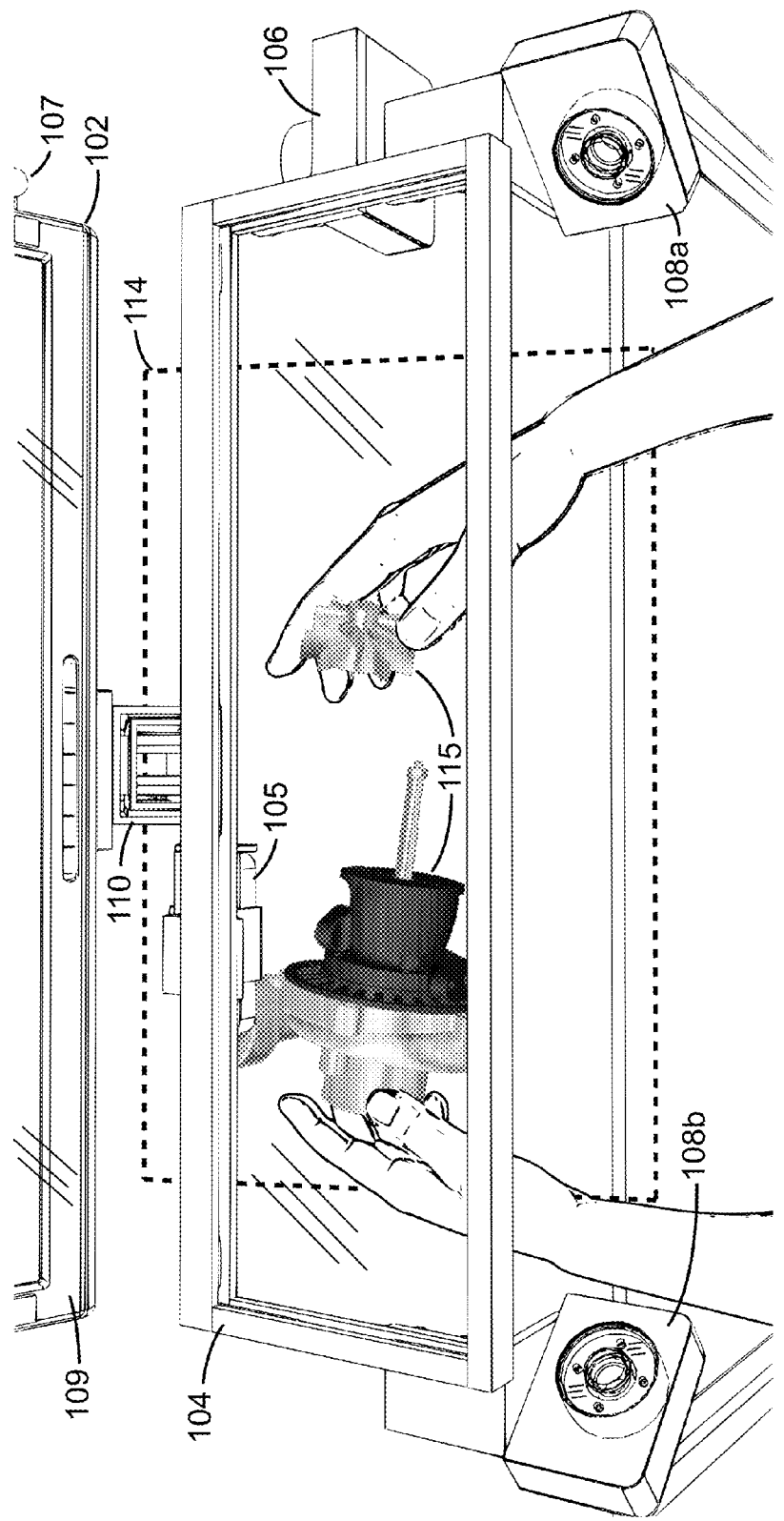
FIG. 5 is the perspective view of the user of an embodiment of an immersive, direct interaction stereoscopic display system showing a method for interacting with virtual workpieces.

FIG. 5 shows a perspective view from the point of view of the user of a system according to embodiments of the present disclosure, illustrating the capability to simulate direct interactions between the user and virtual objects. In the embodiment depicted, the system derives the locations and poses of the hands of the user, then calculates the proximity of each finger or relevant portion of the hand to the nearest part of the virtual objects. Software then manipulates the virtual objects according to various rules that govern the reaction of virtual objects to user inputs. FIG. 5 further illustrates the occlusion of virtual objects by the hands of the user. In this embodiment, the system recognizes the fingers, or parts of the hand that are nearer to the user viewpoint position and selectively generates only the portion of the graphics that are not "behind" the hands. This further adds to the illusion that the hands or fingers or the user-controlled objects are directly interacting with the virtual objects or interfaces.

Figure 6A:
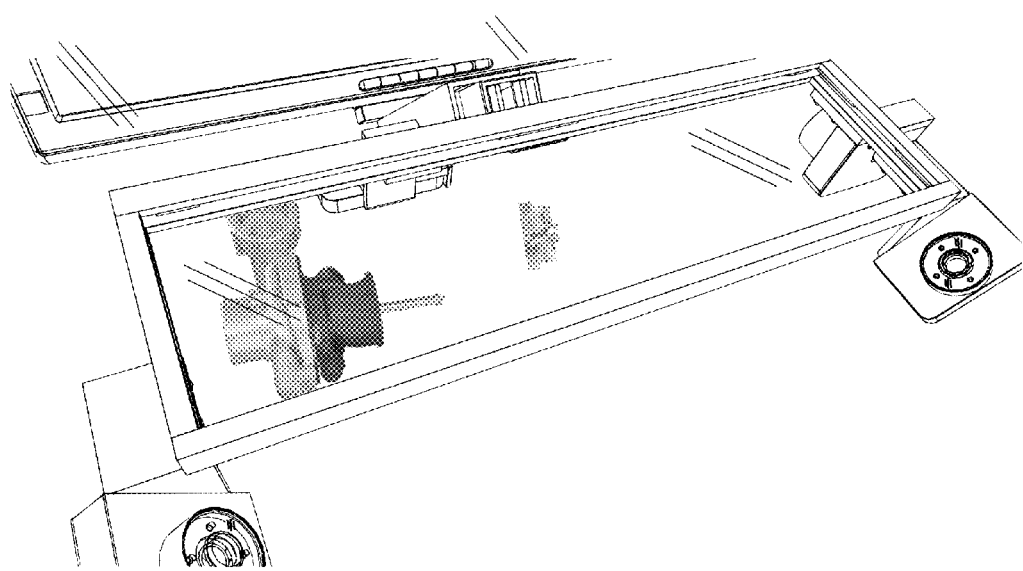
FIGS. 6A, 6B, and 6C are a series of views from the perspective of the user of the system, which show that, as the user moves about the display, the displayed virtual imagery is updated to appear from the proper perspective.
Figure 6B:
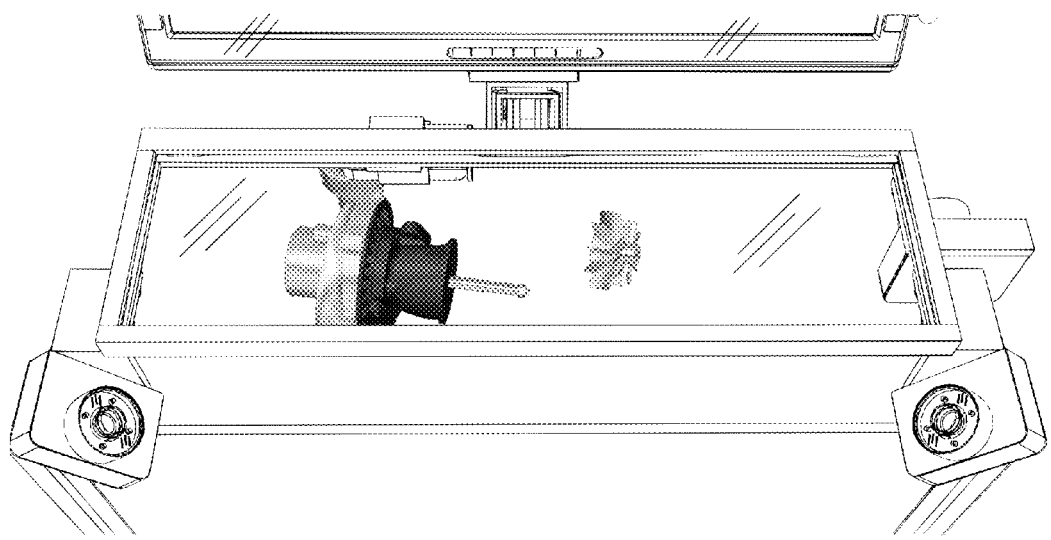
Figure 6C:
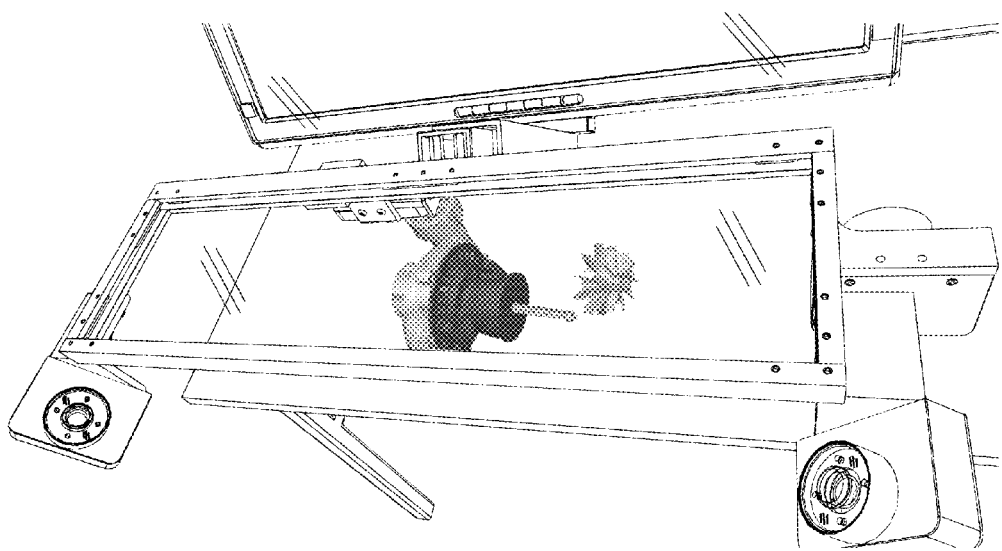

FIGS. 6A to 6C show perspective views from the viewpoint of a user moving from left to right in front of the display system. These figures illustrate the simulation of motion parallax effect by an embodiment system. This effect is achieved by tracking the display components as well as the viewpoint of the user and by continuously calculating the correct corresponding view to display for each new user viewpoint location.

Figure 7:
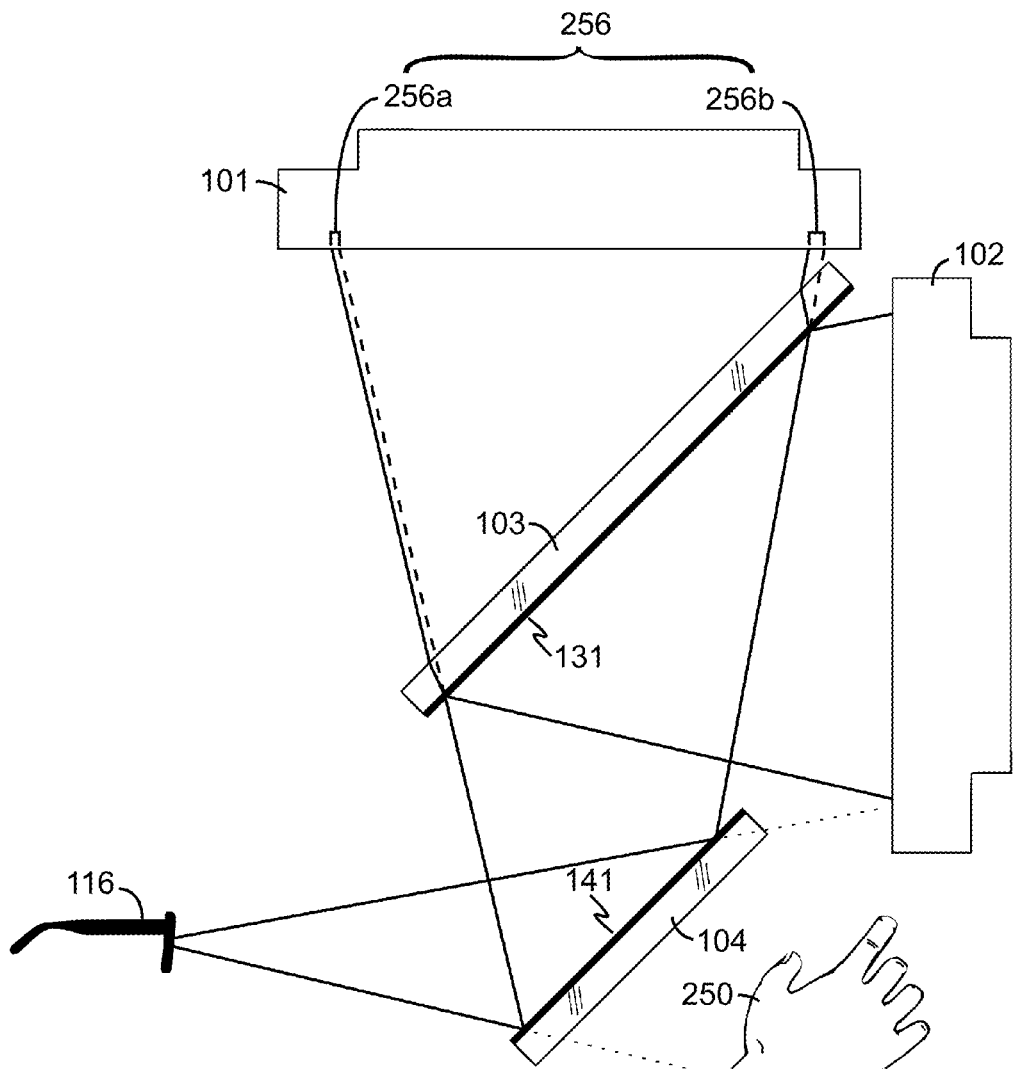
FIG. 7 is a side schematic view of an embodiment of an immersive, direct interaction stereoscopic display system showing a line of sight from the display to the user with an exaggerated indication of correctable divergence or misalignment between display images due to refraction of light through the exaggerated thickness of a beam combiner substrate.

Reference is now made to FIG. 7, which shows a side schematic view of an embodiment system illustrating the line of sight from the displays 101 and 102 to the viewpoint position of the user. In the embodiment depicted, the first beam combiner 103 and the second beam combiner 104 are partially transparent mirrors with mirrored surfaces 131 and 141, respectively, in the orientations shown. The mirrored surface 131 of the first beam combiner 103 faces the second display 102. In this orientation, the light from the second display 102 is directed to the user-viewpoint position behind the glasses 116 without any secondary or ghost images or refraction-related misalignment. The light from the first display 101 is transmitted through the substrate thickness of the first beam combiner 103, where it undergoes a slight shift 256a and 256b due to refraction as it travels through the thickness of the substrate. The light then reflects off the mirrored surface 141 of the second beam combiner 104 towards the user viewpoint position. In the embodiment shown, the first beam combiner 103 is a partially transparent mirror, which is shown with exaggerated thickness in order to differentiate the mirrored 131 from the substrate surface. The degree of image misalignment 256 due to refraction of the light from the first display 101 through the substrate thickness is also exaggerated. In actuality, the thickness of the partially transparent mirror 103 is much less and the image misalignment 256 due to refraction is negligible, or can be effectively adjusted away when initially installing and setting the position of the first display panel 101.

The view portrayed in FIG. 7 also illustrates how the partial transparency of the second beam combiner permits the user to simultaneously view his or her hand 250 with the virtual imagery. In the embodiment shown, the second beam combiner 104 is also a partially transparent mirror. The partially transparent mirrors used as the first and second beam combiners 103 and 104 may have a variety of transmission to reflection ratios. For instance, in some embodiments, both may be essentially partially transparent mirrors with a 50 to 50 transmission to reflection ratio, or both may have unequal transmission to reflection ratios, such as 70 to 30. Other embodiments may include various different combinations of partially transparent mirrors with equal and unequal transmission to reflection ratios.

Figure 8:
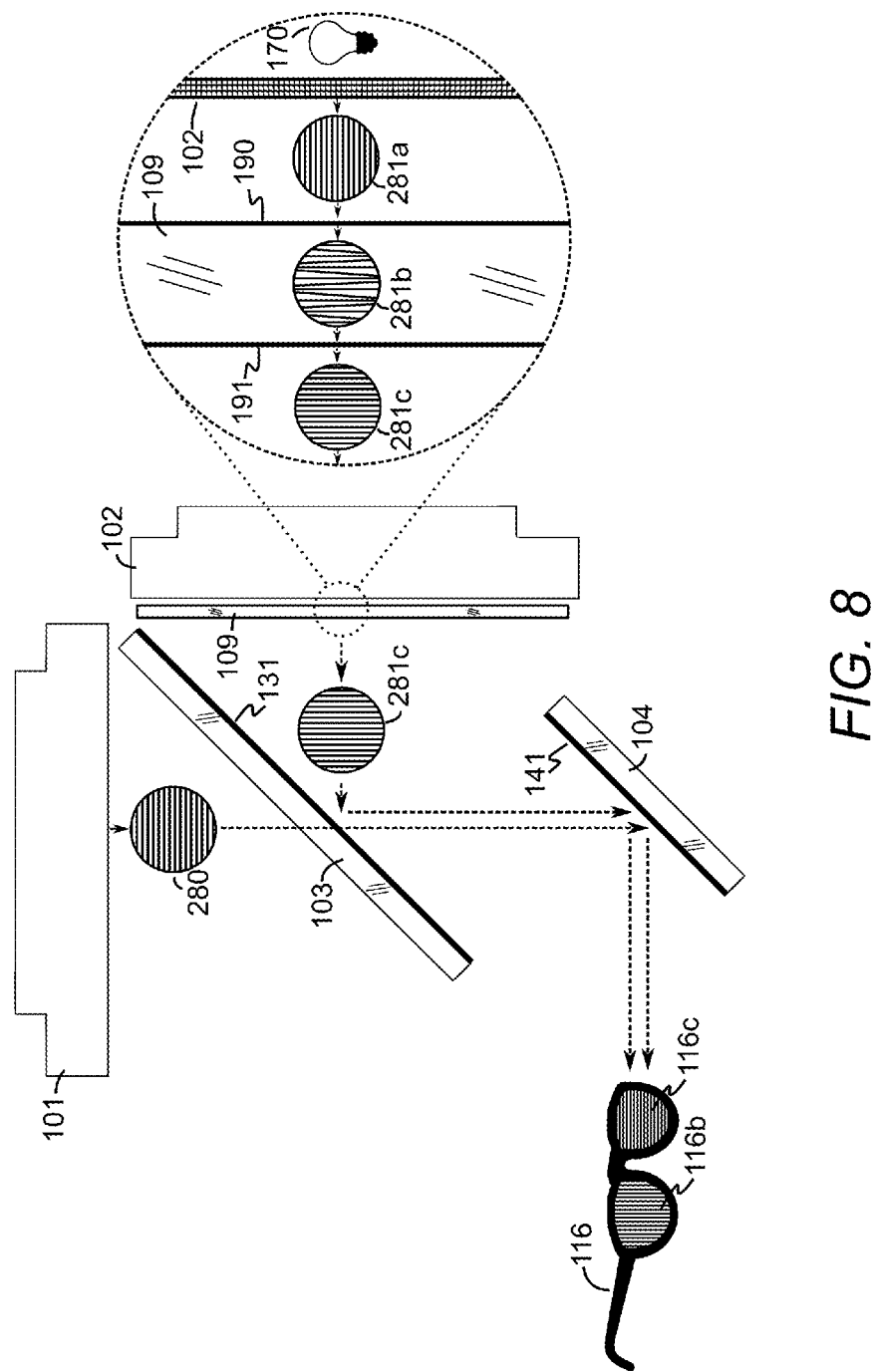
FIG. 8 is a side schematic view of an embodiment of an immersive, direct interaction stereoscopic display system showing components and an example orientation of the components for conveying polarized images to a user wearing polarized glasses with polarizing lenses at the angles shown.
Figure 9:
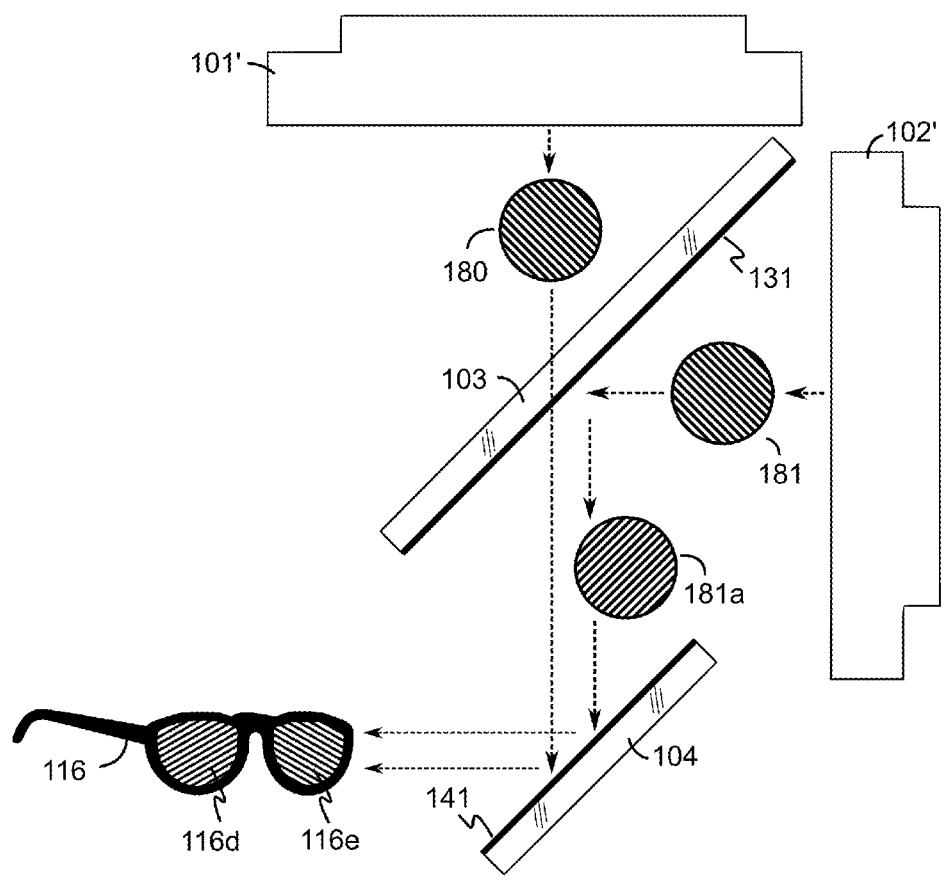
FIG. 9 is a side schematic view of an embodiment of an immersive, direct interaction stereoscopic display system showing components and example orientation of the components for conveying polarized images from the displays to a user wearing polarized glasses with polarizing lenses at the angle shown.

Turning now to FIGS. 8 and 9, these figures show side schematic views of embodiment systems using different common display panel technologies. These views, specifically, illustrate the methods of delivering passive-polarized stereoscopic images with two common types of LCDs. In the embodiment systems described herein, the method of relaying stereoscopic images to the user is by passive polarization. Those skilled in the art will understand the principles of operation of linear passive-polarized displays. In short, the left and right image channels of a stereoscopic image are polarized at angles that are 90 degrees apart from each other. These images are selectively passed on to the left and right eyes of the user through glasses 116 with polarizing filters on the right and left lenses that are also set at 90 degrees to each other. The left lens of the glasses use a polarizing filter that corresponds to the polarization angle of the display panel dedicated to the left image channel and vice versa for the right image channel.

In another example, the display may be configured similar to setup shown in FIG. 8. However, instead of using a single half-wave plate affixed to one display to achieve stereo images via orthogonal linear polarization, a circular-polarization approach may be employed. In this case, a quarter-wave plate would be affixed to each display, and the user wears circular polarized 3D glasses. The quarter-wave plates would circularly polarize the light from each display 101, 102. The light from the first display 101 would reflect once off the second beam combiner 104, which would change the direction of the circular polarized light from left-handed to right-handed or vice versa. The light from the second display 102 would reflect twice: once off the first beam combiner 103, and once off the second beam combiner 104. This double reflection would reverse the handedness of the light polarization from the display twice, resulting in the light returning to its original handedness. The light from each display 101, 102 would thus be opposite handedness from each other, which would allow the user wearing circular polarized 3D glasses to perceive the stereo imagery.

Most LCDs have a natural linear polarization angle. For some displays, like twisted nematic or TN LCDs, as shown in FIG. 9, this angle lies at a 45-degree angle 180 and 181 to the sides of the display panel. For TN displays 101' and 102', when the display image from the lower vertical display 102' is reflected off of the first beam combiner 103, the polarization angle 181 is flipped from 135 to 45 degrees 181a. When the images from both displays 101' and 102' reflect again off the second beam combiner 104 towards the user, the polarization angles of both images flip 90 degrees again, though they remain 90 degrees apart from each other. To receive the corresponding left and right-eye images using these TN-type display panels, the user simply wears stereoscopic polarizing glasses 116 with the polarization angles of the left lens set at 135 degrees 116e and the polarization of the right lens set at 45 degrees 116d or vice versa.

For other LCD panels, for instance in-plane switching (IPS) or vertical alignment (VA) displays, the natural polarization angle of the display is parallel to or perpendicular to the sides of the display panel. IPS or VA-type LCDs are often preferable due to their better color qualities and wider viewing angles. However, when using displays with vertical or horizontal polarization, as shown in FIG. 8 the polarization angle of the light 281a from the display panel 102 in the lower position does not flip 90 degrees when reflecting off the mirror. Instead, it remains at the same angle. Thus, the images from the displays 101 and 102 will arrive to the user with the same polarization angle and no separation of left and right stereo image channels will be possible. For this reason, in various embodiment incorporating IPS display panels, a simple combination half-wave plate and linear polarizing filter 109 is attached to the front of the lower display panel 102. The half-wave plate 190 rotates the polarization angle of the lower display panel light 281a by 90 degrees and then the linear polarization filter 191 filters out any portion of the light 281b not rotated to the desired angle, with the result being clean vertically polarized light 281c. With this, the image of the lower display 102 is rotated 90 degrees relative to the upper display panel 101. The left and right channels of light are thus able to be selectively delivered to the left and right eyes through the 0 and 90-degree polarized lenses 116b and 116c of the glasses 116.

Figure 10A:
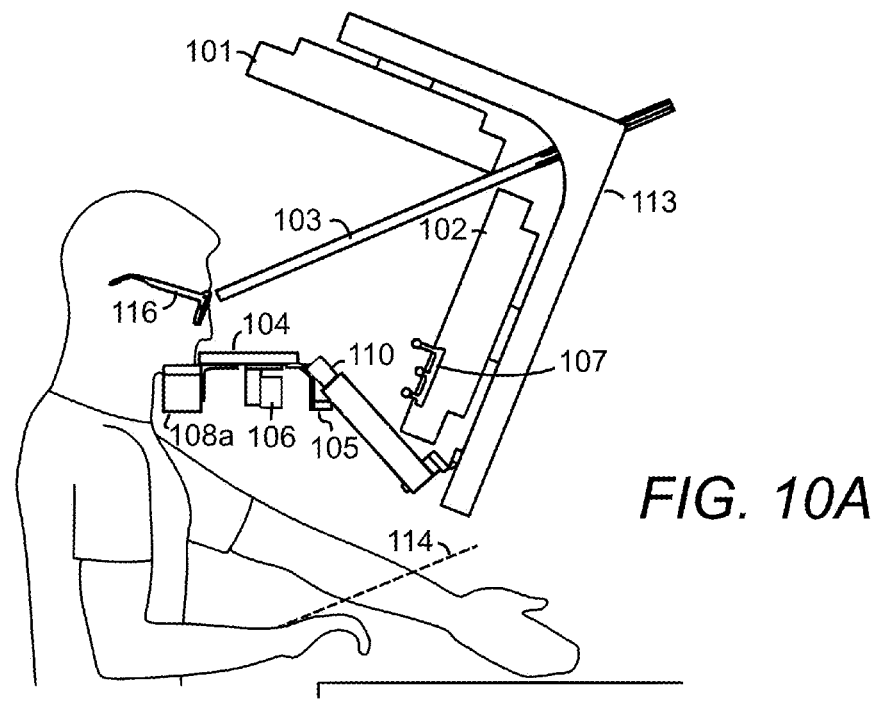
FIGS. 10A and 10B are side schematic views of an embodiment of an immersive, direct interaction stereoscopic display system shown with display panels of various sizes installed, demonstrating a range of adjustments available with the system.
Figure 10B:
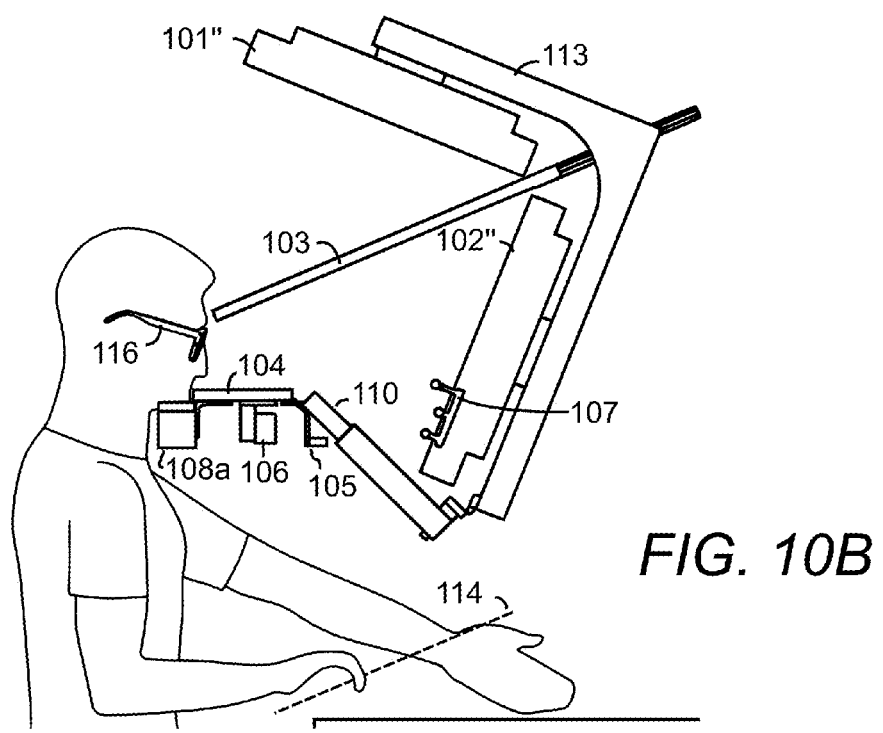

FIGS. 10A and 10B are side schematic views of an embodiment system, showing two sets of display panels of different sizes installed. FIG. 10A shows the display system with a pair of 23-inch display panels 101 and 102, while FIG. 10B the system with a pair of 27-inch display panels 101" and 102". In the embodiment depicted, the frame 113, includes multiple mounting holes or slots to suit a variety of display sizes from under 23" to just over 27". These figures further demonstrate how the adjustment ability of the support arm 110 of the second beam combiner 104 and the thrust distance adjustment ability of the first beam combiner 103 help to facilitate use of display panels of a variety of sizes.

FIGS. 11A to 11C are side views of an embodiment system that include the use of a glare-reducing cover 295 that adjusts to accommodate display panel pairs of various sizes as well as changes in adjustments to the inner components of the system. FIGS. 11A and 11B show the system with display panel pairs of two different sizes. FIG. 11C shows the system with the same display panel pair as that used in FIG. 11B but with the inner components of the system adjusted so that the virtual image plane 114, not shown, is at a farther focal distance.

Figure 12:
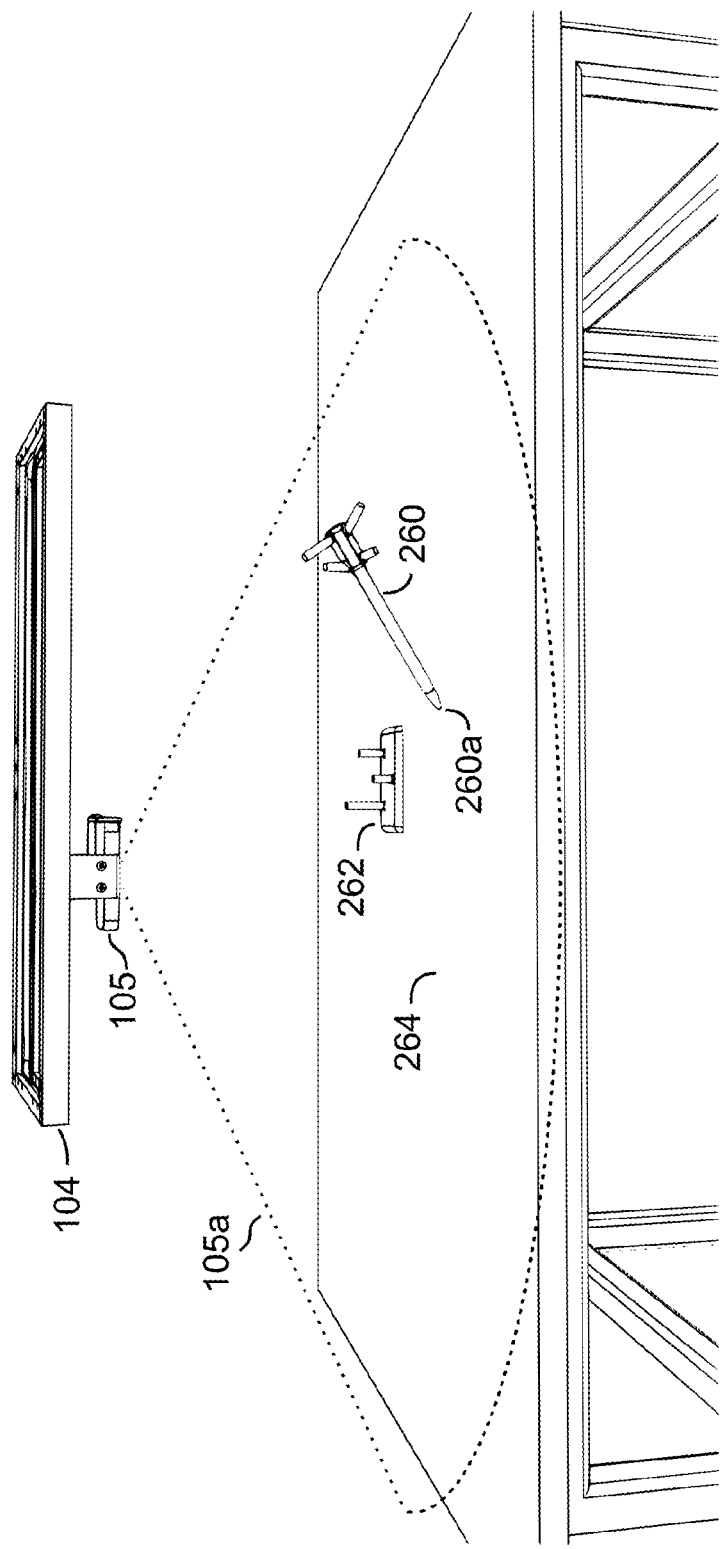
FIG. 12 is a front perspective view of an embodiment of an immersive, direct interaction stereoscopic display system showing additional optional components including a stylus-type input device as well as a tracking marker for desktop or other working surfaces for 2D design or user-input capturing applications.

FIG. 12 depicts a possible setup for design applications. A stylus 260 with attached tracking markers is used to write, draw, or otherwise design on a working surface 264. The tracking sensor 105 captures the position and orientation of the stylus 260 along with the position and orientation of a tracking marker 262 set on the working surface 264. The system uses previously established data on the geometry of the stylus 260 to calculate the location of the stylus point 260a and the vector direction of the stylus body. The system then determines when the stylus point 260a makes contact with the working surface 264 and relays the stroke marks made by the user to application software. This stroke-capturing capability may be useful for a variety of tasks including 2D art and design, handwriting capturing, digitization of existing drawings, blueprints, or patterns, and true-to-scale capturing of profiles of flat-shaped parts, tools et cetera.

Figure 13A:
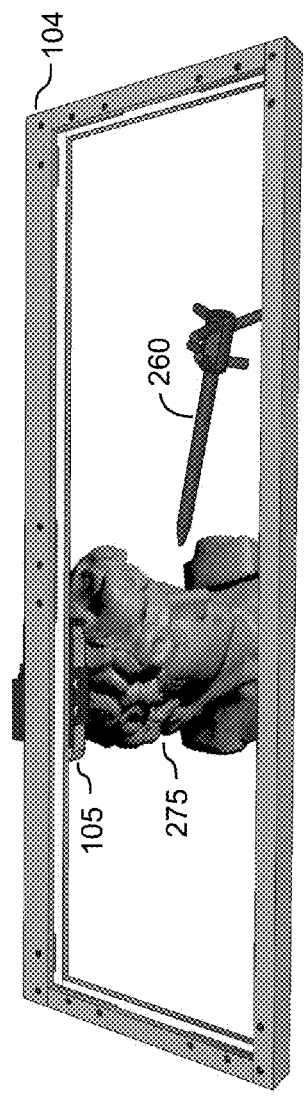
FIGS. 13A and 13B are user perspective and front perspective schematic views, respectively, of an embodiment of an immersive, direct interaction stereoscopic display system showing an additional optional stylus-type input device used in an example 3D virtual sculpting application.
Figure 13B:
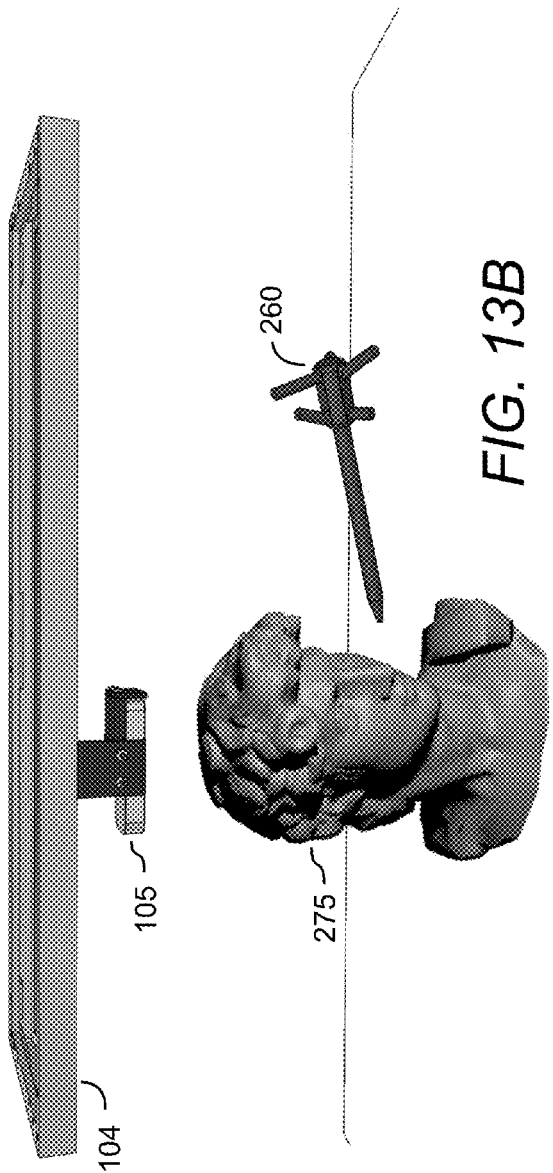

A virtual sculpting application is depicted in FIGS. 13A and 13B. These user perspective and front views depict one embodiment system with the inclusion of a stylus 260 that may be useful for various design and coordinate measuring applications. The position and orientation of the stylus 260 is captured by the sensor 105. The 3D position information of the stylus 260 is relayed to a processor where it may be used as input for a variety of design and measurement software applications. Virtual sculpting and 3D coordinate measurement are two examples of applications where the use of a tracked stylus 260 may be advantageous. Given the robust tracking capability of the sensor 105, the fingers or hands of the user may certainly be used as inputs for virtual sculpting or 3D coordinate measuring applications. However, in some instances, users may feel a greater sense of precision or simply be more accustomed to using a pointed device such as the stylus 260.

In FIGS. 14A and 14B, an augmented reality application for medical use is depicted. These figures show front and user viewpoint perspective views of an embodiment system set up with the components to track a patient 266 and overlay a virtual model of the internal anatomy 267 of a patient onto the actual view of the patient 266. In these figures, the system is arranged so that the images of the internal anatomy 267 are updated to appear to the user in the correct perspective from wherever the user is positioned in front of the display system. Fiducial markers 268, represented only schematically in these figures, are attached to the patient or alternatively on to components fixed rigidly to the patient. The markers 268 should be compatible to whichever imaging modality is used for scanning the internal anatomy of the patient. The medical scanning system stores the internal anatomy geometry data of the patient 266 in relation to the location data of the tracking markers 268 and relays all of this information to a processor, not shown in the figures. The processor compares the data regarding the tracking markers 268 from the medical imaging source with the live data feed from the sensor 105 and uses algorithms to determine the correct degrees to translate, rotate and scale the anatomy imagery 267 in three dimensions in order for the internal anatomy to appear to coincide with the patient 266. This ability to overlay high quality medical imagery in situ with patients in real time may be highly beneficial for a variety of medical scenarios including training, surgery rehearsals, surgery planning and intra-operative visualization.

Figure 15:
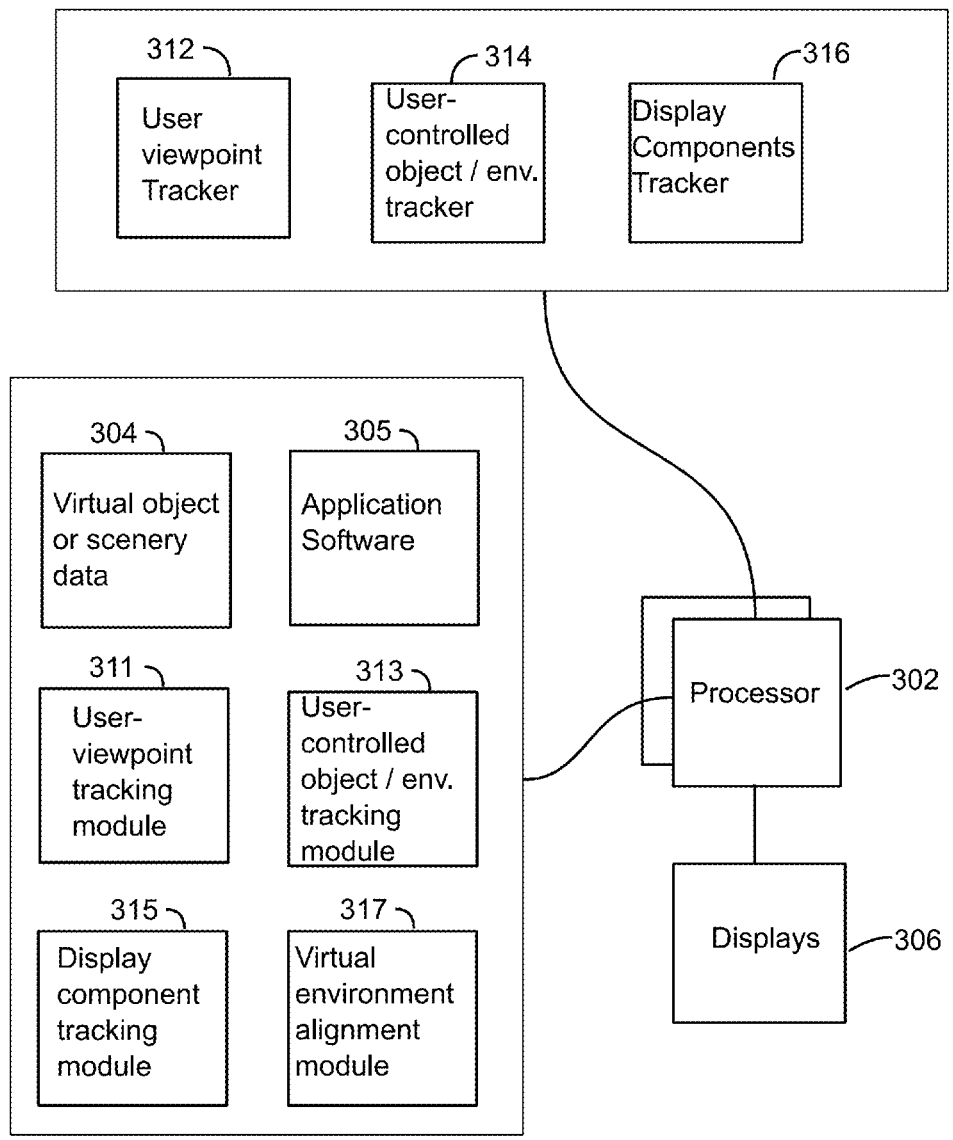
FIG. 15 is a block diagram of software and hardware architecture for an embodiment of an immersive, direct interaction stereoscopic display system.

A block diagram of software and hardware architecture for one embodiment interactive display system is shown in FIG. 15. This figure illustrates the essential hardware and software components used by the embodiment display system to receive user inputs and translate these inputs into commands that influence or change virtual environments or interfaces. The various tracking sensors 316, 314, and 312 relay data to a processor or multiple processors 302 working in parallel. One sensor 316 tracks the viewpoint position of the user while another 314 tracks the position of user-controlled objects, including possibly the hands of the user or hand-held input devices such as a stylus. The user-controlled object sensor 316 may also track environment markers such as a 2D writing plane marker 262, which, for instance, may be positioned on a desktop 264 as seen in FIG. 12. An additional sensor 312 tracks the position and orientation of the display system components in relation to each other; for instance, it tracks the position and orientation of the second beam combiner 104, not shown in this figure, in relation to the rest of the display system.

Tracking sensor modules 311, 313, and 315 interpret and translate the tracking data from the tracking sensors 312, 314, and 316 into formats that are usable by a virtual alignment module 317. In the embodiment depicted, all tracking sensors 312, 314, and 316 are mounted on the second beam combiner 104 at established positions. The virtual environment alignment module 317 receives the user viewpoint, user-controlled object and the display component position information and determines the locations of the virtual screen plane 114, the user viewpoint position and the position of the hands 250 of the user or user-controlled objects 260 in relation to the second beam combiner 104. When virtual object or scenery data 305 is called up by application software 305, the virtual environment alignment module 317 determines the correct perspective to display the 3D images of the virtual objects or scenery. The virtual environment alignment module 317 establishes a geometric framework for this purpose, which is built off of the known geometric relations between the tracking sensors and the second beam combiner 104. This geometric framework essentially determines where to place and point a set of "virtual cameras" in order to capture perspective-correct stereoscopic views of the virtual objects or scenery. The virtual environment alignment module 317 then instructs the processor or processors 302 to relay images of the virtual objects or scenery in the correct perspective views to displays 306 in the display system, which helps to ultimately recreate the 3D image of the virtual objects or scenery to the user in the appropriate perspective. Because the viewpoint position of the user is tracked, the virtual environment alignment module 317 is able to update the virtual object or scenery graphics so that they appear to the user to be spatially fixed in place at the correct perspective even as the user moves about in front of the display system. The virtual environment alignment module 317 also establishes a geometric framework pertaining to the location of user-controlled objects including, for instance, the hands of the user or a stylus, in relation to the virtual screen plane so that application software 305 may use the locations and movements of one or more fingers or hands or one or more user-controlled objects as inputs. The inputs are utilized by the application software 305 to interact with or manipulate virtual objects, scenery or other interfaces according to rules written in the application software 305.

Figure 16:
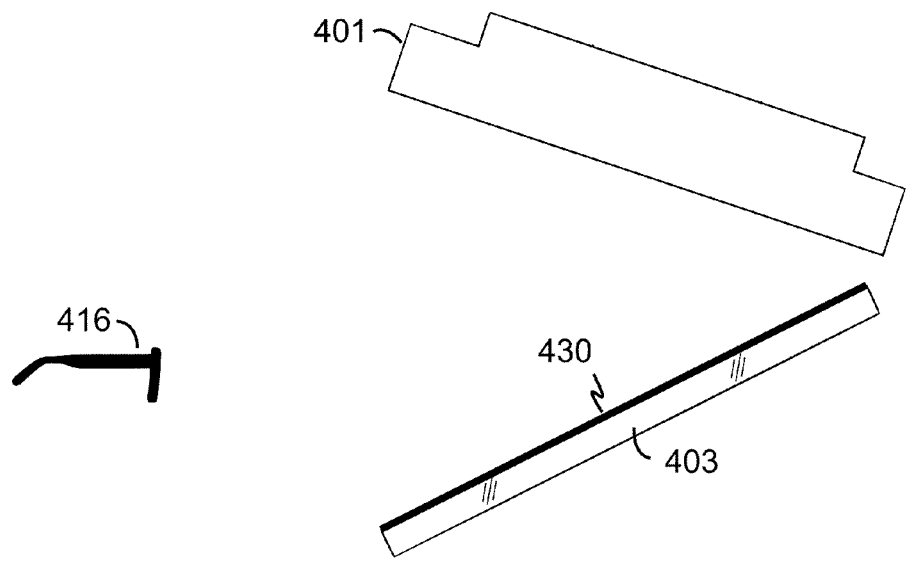
FIG. 16 is a side schematic view of an alternative embodiment immersive direct interaction stereoscopic display, which uses a passive-polarized stereoscopic dual stacked panel display.
Figure 17:
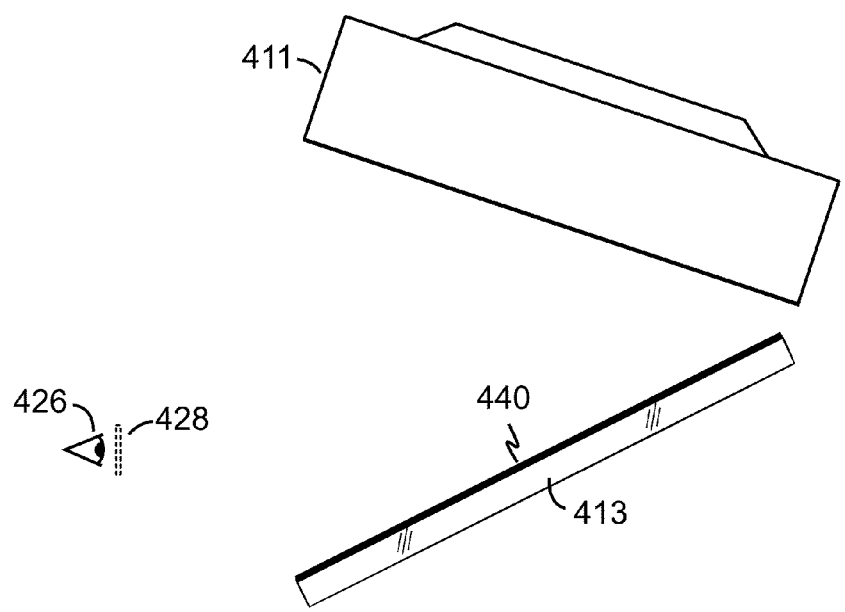
FIG. 17 is a side schematic view of an alternative embodiment immersive direct interaction stereoscopic display, which uses a spatial light modulator-based digital holographic display.

FIGS. 16 and 17 illustrate alternative embodiment direct interaction display system designs using two different types of high-resolution displays. The use of only one display panel allows the bulk of the system to be minimized for applications where space is at a premium. The tradeoff for smaller system size is a somewhat higher cost for either of the display types, though there would be only one display panel used for such a system.

The display 401 shown in FIG. 16 is a dual stacked panel passive-polarized stereoscopic display. This type of display uses two stacked LCD screens inside of one display housing and passive polarization to deliver a full-native resolution stereoscopic picture. The display produces full-resolution left and right stereo images, each with separate polarization angles. The light from the display 401 reflects off the mirrored surface 430 of a partially transparent mirror 403 and passes through a pair of passive-polarized glasses 416 with lenses arranged to selectively accept the corresponding left or right-screen images.

The display representation 411 shown in FIG. 17 is a spatial light modulator-based digital holographic display, developed by SeeReal Technologies of Luxembourg. With this display design, there are no requirements for any type of glasses to see virtual objects or scenes in 3D. One or more sensors, not shown, adjacent to the spatial light modulator display 411, track the eyes 426 of the user. A processor, not shown, connected to the display 411 receives the information from the tracking sensors and performs holographic synthesis calculations for the virtual objects or scenes and determines a complex wave-field for the objects or scenes to be represented by the spatial light modulator-based display. The display creates a 3D wave-field holographic image that is visible only within a viewing zone, called a "viewing window" 428, at the location of the eyes 426 of the user. The display can produce images with true depth of focus that corresponds with the geometries of the virtual 3D objects or scenes. Light from the display 411 reflects off the mirrored surface 440 of a partially transparent mirror 413 towards the viewing window 428 directly adjacent to the eyes 426 of the user. The systems depicted in FIGS. 16 and 17 are again schematically representations, and, though not shown in the figures, embodiment systems may include a tracking sensor or sensors for the user interaction volume below the partially transparent mirror as well as a sensor or sensors for tracking the user-viewpoint.

Thus the reader will see that at least one embodiment of the direct interaction stereoscopic display system can provide a combination of unique features including a full-resolution picture that is comfortable to view, a highly intuitive and responsive interaction interface, a robust software and hardware framework that uses low-cost components and uses system resources efficiently, and a flexible hardware design that accommodates the ergonomic and functional needs of the user.

While the above description contains many specificities, these should not be construed as limitations on the scope, but rather as an exemplification of several embodiments thereof. Many other variations are possible. For example, the displays 101 and 102 in the two-display variation shown in FIG. 2, may be mounted in reverse from what is shown so that the rear side of the lower vertical monitor 102 faces the eyes of the user and the support arm 110 of second beam combiner 104 attaches onto an extended portion of the display system support frame 113.

In another example, the second beam combiner 104 may not attach to the support arm 110 as shown in FIG. 2, but instead may attach to one or more planar linkage arms that connect to the left or right or both left and right edges of the frames of the first and second beam combiners 103 and 104, as seen from the perspective of the user.

In yet another example, the sensor or sensors 108a and 108b for tracking the user viewpoint, the sensor 106 for tracking the display component position, and the interaction volume tracking sensor 105 may not all be mounted adjacent to the second beam combiner 104. All sensors or any combination of the said tracking sensors may be made to function equivalently being attached in various combinations adjacent to other display system components including the first beam combiner 103, the second display 102, the first display 101 or the display support frame 113. The equivalent function of the sensors placed in various locations is realized by mounting the sensors so that there is a clear view to the tracked regions. The display component tracking sensor 106 may be made to, instead, track the location of the second beam combiner 104. In this case, the tracking marker 107 is not used. Instead, a tracking marker is attached to the second beam combiner within view of the display component-tracking sensor 106 wherever it is installed. In this and other envisioned examples, the system has access to the relevant locations of all tracking sensors in relation to each other for whichever orientation of sensors is chosen, with the result that the user experience is ultimately identical from one orientation to another.

According to various embodiments of the present disclosure, the display system may feature motion-sensing to allow for direct interaction and head tracking for correct viewer-centered perspectives. The combination of these features may make this system beneficial for many purposes, including but not limited to: spatially-aligned visualization, training, design and gaming. Thus the present disclosure may have application in a variety of fields, including medicine (e.g. preoperative surgery planning, rehearsals and intraoperative spatially aligned visualization, stereotactic surgery, telemedicine), medical education and training (e.g. neurology, dentistry, orthopedics, ophthalmology, et cetera), complex 3D data visualization and processing (e.g. biotechnology, computational chemistry, cartography, and geological engineering), the design arts (e.g. industrial design, 2D drawing, 3D model creation, 3D animation), engineering applications (e.g. 3D modeling, virtual prototyping, assembly inspection, mixed reality test fitting, analysis results processing), and entertainment (e.g. gaming).

Accordingly, there may be several advantages of one or more aspects of the direct interaction stereoscopic display system disclosed herein. One is that embodiments of the display system may offer a full-resolution stereoscopic picture without flicker. Another advantage is that embodiments of the display system may utilize one or more low-latency and highly accurate motion sensors to capture user gestures or the movements of user-controlled objects, allowing for seamless direct interaction and enhancing the sense of immersion to users. Additionally, in one or more embodiments of the display system, the interaction volume, and the visualization volume (i.e., the volume below the display where 3D images of virtual objects or interfaces appear) are co-located. The advantage here is that as users interact directly with virtual objects or interfaces presented in front of them, the proprioceptive sense (innate sense of the position of one's limbs or joints) of the user may be utilized in addition to the stereoscopic vision cues, resulting in a high degree of realism and immersion. Another advantage is that embodiments of the present disclosure can effectively track the user-viewpoint using only one sensor and effectively track the user interaction area using only one sensor, which may lessen the CPU load and allow the use of a less expensive computer.

Additional advantages of one or more embodiments of the display system are that the overall system may be relatively lightweight and mounted on a mobile stand, which could allow the system to be used in a sitting or standing position or any position between, and which may further allow the system to be easily positioned to overlay 3D graphics in situ with real environments to facilitate augmented reality applications. In one or more embodiments, all tracking sensors are mounted directly on components of the system. The resulting advantage may be a compact system footprint as well as greater freedom of movement about the display without the risk of interfering with separately-mounted tracking sensors as is the case with previous approaches.

Other advantages of one or more aspects include the use of simple, lightweight and inexpensive passive-polarized glasses, which may provide a smooth high-fidelity picture without flicker. Additionally, the display system components may be dynamically adjusted in one or more aspects providing multiple advantages including the ability to install display panel pairs of a variety of sizes to suit the needs of the user. Another advantage of the dynamically adjustable display components in one or more aspects may be an ability to easily adjust the location of the virtual image plane, which is the image plane that the display virtually projects below the display system, so that the 3D imagery can be precisely co-located with real environmental components to facilitate high-precision augmented reality applications. The ability to set the virtual image plane location may also allow the user to keep the accommodation and vergence distances for 3D virtual images in parity, which can reduce and/or minimize eyestrain for users. Another advantage stemming from the ability to dynamically adjust display components in one or more aspects is that the gaze angle of the user to the virtual image plane may be easily adjusted to a variety of angles including more ergonomically-correct downward gaze angles, which are appropriate for up-close work.

Some additional advantages of one or more aspects relate to the utilization of a modular design for the display system, including the use of quick-install display mounts with VESA-standard mounting holes to allow for easy installation of display panels of a variety of sizes and models. This advantage may allow users the freedom to choose a display pair that precisely fits their needs and budget. An additional advantage of the modular design of the display system in one or more embodiments is that the process to upgrade or service components of the system may consequently be simpler and more straightforward. Further advantages of one or more aspects may be apparent from a consideration of the drawings and ensuing description.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. An interactive display system, comprising:
a user interaction volume;
a first display for displaying a first image;
a second display for displaying a second image;
a first beam combiner positioned at least partway between the first display and the second display, the first beam combiner configured to receive, and to optically overlay, the first and second images, whereby each of the first display and the second display is concurrently devoted to either the left or the right stereo image channel, the first beam combiner comprising:
a substrate surface at least partially facing one display, wherein light from that display is transmitted towards the user interaction volume;
a mirrored surface at least partially facing the second display, at which light from the second display is reflected towards the user interaction volume; and,
a second beam combiner offset from first beam combiner in the direction of the user interaction volume, the second beam combiner configured to receive, and to optically overlay, the combined first and second images relayed from the first beam combiner with a view of the user interaction volume, the combined two images forming respective stereoscopic left eye and right eye images of a virtual environment, whereby a user looking at the second beam combiner from a user view position perceives the virtual environment reflected from the second beam combiner as originating from within the user interaction volume, the second beam combiner comprising:
a substrate surface at least partially facing the user interaction volume, wherein light from the user interaction volume is transmitted towards the user view position;
a mirrored surface at least partially facing the first beam combiner, wherein light from the first beam combiner is reflected towards the user view position; and
one or more tracking sensors arranged to sense at least a first input within the user interaction volume and at least a second input within a second volume region, wherein the first input includes position and orientation information of at least one user-controlled object, and wherein the second input includes user viewpoint position and orientation information; and
a processor arranged to receive the second input and adapt positioning of the images of the virtual environment so that the virtual environment appears visually aligned with the user interaction volume according to a perspective of the user, the processor further arranged to receive the position and orientation information of the at least one user-controlled object, and determine a corresponding position and orientation in the virtual environment and update the virtual environment based on the corresponding position and orientation.

2. The interactive display system according to claim 1, further comprising a support for the first display and the second display and the first beam combiner and the second beam combiner, the support adapted to allow adjustments to the first display and the second display and the first beam combiner, whereby an image plane of the first display and an image plane of the second display may be brought into alignment which each other to the user.

3. The interactive display system according to claim 2, wherein the support comprises a frame, the system further comprising a frame support to position the frame above the user interaction volume, the frame support adapted to allow adjustments to a frame height, a frame forward position, a frame backward position, a frame left position, a frame right position, a frame horizontal swivel, and a frame vertical tilt, whereby the support may be adjusted to suit the ergonomic requirements of the user.

4. The interactive display system according to claim 3, further comprising a means to carry out said adjustments to the frame through a single point of application whereby users can manipulate display through the range of said adjustments using a single motion.

5. The interactive display system according to claim 2, wherein the support comprises a frame, the system further comprising one or more tracking sensors arranged to sense the second input and a third input, wherein the third input includes position and orientation information of one of the first display and the second display, wherein the processor is adapted to receive the second input and the third input and calculate a viewable screen size, an image plane position, and an orientation of the first display or the second display relative to the display system to make corrections to a virtual environment camera position in order for the virtual environment to appear visually aligned with the user interaction volume according to the user viewpoint.

6. The interactive display system according to claim 5, wherein the frame rigidly supports at least the first display, the second display, and the first beam combiner in a fixed spatial relationship, the system further comprising a second support for the second beam combiner in such a way that the position and orientation of the second beam combiner may be arbitrarily adjusted relative to the frame, and wherein the one or more tracking sensors are mounted adjacent to the second beam combiner, wherein the processor is arranged calculate the position and orientation of the second beam combiner in relation to the display system and direct adjustment of the virtual environment camera position in order for the virtual environment to appear visually aligned with a user interaction region, whereby the image plane of the second display may be repositioned to suit a service or an ergonomic requirement of the user.

7. The interactive display system according to claim 6, wherein a second beam combiner height, a second beam combiner forward position, a second beam combiner backward position, and a second beam combiner vertical tilt may be adjusted relative to the frame.

8. The interactive display system according to claim 6, wherein a user viewpoint tracking sensor is coupled to the second beam combiner, thereby centering a field of view of the viewpoint tracking sensor on the user.

9. The interactive display system according to claim 6, further comprising one or more tracking sensors arranged to sense an object input, wherein the object input includes position and orientation information of at least one object, wherein the processor is further arranged to receive the object input and determine a corresponding position and orientation in the virtual environment and use the object input to update the virtual environment, thereby causing the virtual environment to appear visually aligned to the object according to the perspective of the user.

10. The interactive display system according to claim 6, further comprising one or more tracking sensors arranged to sense an object input, wherein the object input includes position and orientation information of at least one object, the object input having a field of view centered on the user-controlled object.

11. The interactive display system according to claim 9, wherein only one set of sensors is adapted to track the one or more user-controlled objects and the one or more objects in the real-world environment.

12. The interactive display system according to claim 1, wherein the processor is adapted to receive eye calibration data indicating positions of a left eye and a right eye of the user with respect to a position and an orientation of the user viewpoint and wherein the processor is adapted to generate a stereoscopic left image and a stereoscopic right image based on the eye calibration data and the second input.

13. The interactive display system according to claim 12, wherein the eye calibration data comprises a calculated user view center and an inter-ocular distance to generate a distinct left eye position value and a distinct right eye position value.

14. The interactive display system according to claim 1, wherein the user-controlled object comprises at least one of the hands of the user.

15. The interactive display system according to claim 1, wherein the user-controlled object comprises at least one stylus device.

16. The interactive display system according to claim 1, wherein the user-controlled object comprises at least one haptic device.

17. An interactive display system, comprising:
a user interaction volume;
a dual stacked panel passive-polarized stereoscopic display for displaying stereoscopic images to a user or users wearing corresponding passive-polarized glasses;
a beam combiner positioned at an acute angle from the display, the beam combiner comprising:
  a substrate surface at least partially facing the user interaction volume, wherein light from the user interaction volume is transmitted towards the user view position;
  a mirrored surface at least partially facing the display, wherein light from the beam combiner is reflected towards the user view position; and;
one or more tracking sensors arranged to sense at least a first input within the user interaction volume and at least a second input within a second volume region, wherein the sensed first input includes position and orientation information of at least one user-controlled object, and wherein the sensed second input includes user viewpoint position and orientation information; and
a processor arranged to accept the user viewpoint position and orientation information, and adapt the virtual environment camera position so that the virtual environment appears visually aligned with the user interaction region according to the perspective of the user, the processor further arranged to accept the user-controlled object position and orientation information, and determine a corresponding position and orientation in the virtual environment and use this information to update the virtual environment based on the corresponding position and orientation.

18. An method for displaying a 3D image to a viewer at a view position, comprising:
at a first display, generating a first image having a first polarization, the first image corresponding to a stereoscopic first view of a virtual environment;
at a second display, generating a second image having a second polarization, the second image corresponding to a stereoscopic second view of the virtual environment;
at a first beam combiner positioned at an acute angle from the first display and the second display, passing the first image through the first beam combiner toward a second beam combiner and reflecting the second image toward the second beam combiner, thereby combining the first image and the second image into a stereoscopic virtual image;
at the second beam combiner, passing an image of a user interaction volume through the second beam combiner toward the user view position and reflecting the stereoscopic virtual image toward the view position.

19. The method of claim 18, further comprising:
tracking an eye position of the viewer and
adjusting the first image and the second image to compensate for the eye position.

* * * * *